US011244135B2

(12) United States Patent
Cheng et al.

(10) Patent No.: US 11,244,135 B2
(45) Date of Patent: Feb. 8, 2022

(54) ELECTRONIC CIRCUIT HAVING DISPLAY DRIVING FUNCTION, TOUCH SENSING FUNCTION AND FINGERPRINT SENSING FUNCTION

(71) Applicant: Novatek Microelectronics Corp., Hsinchu (TW)

(72) Inventors: Huan-Teng Cheng, Hsinchu (TW); Ting-Hsuan Hung, Hsinchu (TW); Wei-Lun Shih, Hsinchu (TW); Huang-Chin Tang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/907,306

(22) Filed: Jun. 21, 2020

(65) Prior Publication Data

US 2021/0034835 A1    Feb. 4, 2021

Related U.S. Application Data

(66) Substitute for application No. 62/924,671, filed on Oct. 22, 2019.

(Continued)

(51) Int. Cl.
*G06K 9/00* (2006.01)
*G06F 3/041* (2006.01)
*G09G 3/20* (2006.01)

(52) U.S. Cl.
CPC ....... *G06K 9/00013* (2013.01); *G06F 3/0412* (2013.01); *G06K 9/0004* (2013.01); *G09G 3/20* (2013.01); *G09G 2310/0272* (2013.01)

(58) Field of Classification Search
None
See application file for complete search history.

(56) References Cited

U.S. PATENT DOCUMENTS 8,942,937 B2    1/2015 Miyamoto et al.
9,454,271 B2    9/2016 Miyamoto et al.
(Continued)

FOREIGN PATENT DOCUMENTS

CN    107402680    11/2017
CN    107895143     4/2018
(Continued)

OTHER PUBLICATIONS

Office Action of Taiwan Counterpart Application, dated May 28, 2021, pp. 1-3.

*Primary Examiner* — Joseph R Haley
(74) *Attorney, Agent, or Firm* — JCIPRNET

(57) ABSTRACT

An electronic circuit including a touch control circuit, a fingerprint sensing circuit and a switch circuit is provided. The touch control circuit is configured to receive touch sensing signals from a panel and determine a touch area according to the touch sensing signals. The fingerprint sensing circuit is configured to receive fingerprint sensing signals corresponding to at least one fingerprint image from fingerprint sensors disposed in the panel via fingerprint sensing lines. The switch circuit is coupled to the fingerprint sensing circuit. The switch circuit is configured to be coupled to a part of the fingerprint sensing lines that is selected to form a fingerprint sensing zone for a fingerprint sensing operation according to the determined touch area. Each of the fingerprint sensing lines is selectable to be a boundary of the fingerprint sensing zone. An electronic device and a method for sensing at least one fingerprint image are also provided.

53 Claims, 17 Drawing Sheets

Related U.S. Application Data

(60) Provisional application No. 62/881,912, filed on Aug. 1, 2019, provisional application No. 62/898,551, filed on Sep. 11, 2019, provisional application No. 62/912,660, filed on Oct. 9, 2019.

(56) References Cited

U.S. PATENT DOCUMENTS

| | | |
|---|---|---|
| 9,898,136 B2 | 2/2018 | Miyamoto et al. |
| 10,338,731 B2 | 7/2019 | Song et al. |
| 10,613,677 B2 | 4/2020 | Cho et al. |
| 10,795,190 B2 | 10/2020 | Lee et al. |
| 2014/0139483 A1 | 5/2014 | Miyamoto et al. |
| 2014/0149059 A1 | 5/2014 | Miyamoto et al. |
| 2014/0354596 A1* | 12/2014 | Djordjev ............... G06F 3/0421 345/175 |
| 2016/0232401 A1* | 8/2016 | Hoyos ................ G06K 9/00107 |
| 2016/0349923 A1 | 12/2016 | Miyamoto et al. |
| 2017/0336909 A1 | 11/2017 | Song et al. |
| 2018/0113558 A1 | 4/2018 | Cho et al. |
| 2018/0335880 A1 | 11/2018 | Seol |
| 2019/0187496 A1 | 6/2019 | Lee et al. |
| 2020/0241722 A1* | 7/2020 | Kim ..................... G06F 3/0446 |
| 2021/0012082 A1* | 1/2021 | Uchida ............ H01L 27/14678 |
| 2021/0019489 A1* | 1/2021 | Cho .................... G06K 9/0002 |

FOREIGN PATENT DOCUMENTS

| | | |
|---|---|---|
| CN | 107977122 | 5/2018 |
| CN | 108615032 | 10/2018 |
| CN | 109933233 | 6/2019 |
| CN | 109976651 | 7/2019 |
| TW | 201305873 | 2/2013 |

* cited by examiner

ELECTRONIC CIRCUIT HAVING DISPLAY DRIVING FUNCTION, TOUCH SENSING FUNCTION AND FINGERPRINT SENSING FUNCTION

CROSS-REFERENCE TO RELATED APPLICATION

This application claims the priority benefit of U.S. Provisional application Ser. No. 62/881,912, filed on Aug. 1, 2019, U.S. Provisional application Ser. No. 62/898,551, filed on Sep. 11, 2019, U.S. Provisional application Ser. No. 62/924,671, filed on Oct. 22, 2019, and U.S. Provisional application Ser. No. 62/912,660, filed on Oct. 9, 2019. The entirety of the above-mentioned patent application is hereby incorporated by reference herein and made a part of this specification.

BACKGROUND

Technical Field

The invention relates to an electronic circuit, an electronic device and a sensing method, more specifically, to an electronic circuit and an electronic device adapted to drive a display panel including touch sensors and fingerprint sensors, and a method for sensing at least one fingerprint image.

Description of Related Art

In recent years, demands for fingerprint sensing have been gradually increased. In order to reduce a volume of an electronic device, a fingerprint sensing region may overlap with a display region of the electronic device. For example, an under-display fingerprint identification technique is to embed fingerprint sensors to a display panel, and the fingerprint sensor may sense or capture a fingerprint image through the display panel. When a touch event such as fingerprint identification happens, a touch sensing circuit may report it to an application processor of the electronic device via a specified interface. Next, the application processor further controls a display driving circuit to drive the display panel to display image for fingerprint sensing. On the other hand, the application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information.

However, the display panel may be divided into a plurality of fingerprint sensing zones in a fingerprint sensing direction X that fingerprint sensing lines are arranged, as illustrated in FIG. 18. FIG. 18 illustrates two display panels that are respectively divided into a plurality of fingerprint sensing zones of different sizes in the fingerprint sensing direction X in the related art. The fingerprint sensing zones have also been partitioned in the scan direction Y. Partition of the fingerprint sensing zones is determined and fixedly configured as the electronic device is manufactured. The size of the fingerprint sensing zones in each display panel is constant. In some cases, the finger may touch many fingerprint sensing zones, and the fingerprint image crosses over the touched fingerprint sensing zones in the fingerprint sensing direction X. The fingerprint sensing circuit has to receive fingerprint sensing signals zone by zone, such that a cross zone problem in receiving the fingerprint sensing signals of a fingerprint image is raised. In case of cross zone receiving, the fingerprint sensing circuit has to spend time for switching and re-initialization. That is to say, it may spend more time for fingerprint sensing and identification since the fingerprint sensing signals are received zone by zone.

SUMMARY

The invention is directed to an electronic circuit and an electronic device, capable of providing an efficient method for fingerprint sensing and identification and good user experience for users. In addition, a method for sensing at least one fingerprint image adapted to the electronic circuit is also provided.

The invention provides an electronic circuit adapted to drive a panel including touch sensors and fingerprint sensors. The electronic circuit includes a first circuit, a second circuit and a control circuit. The first circuit is configured to receive touch sensing signals from the touch sensors. The second circuit is configured to receive fingerprint sensing signals corresponding to at least one fingerprint image from the fingerprint sensors via fingerprint sensing lines. The control circuit is configured to determine a touch area according to the touch sensing signals and select a part of the fingerprint sensing lines to form a fingerprint sensing zone for a fingerprint sensing operation according to the determined touch area. Each of the fingerprint sensing lines is selectable to be a boundary of the fingerprint sensing zone.

In an embodiment of the invention, the electronic circuit further includes a switch circuit. The switch circuit is coupled to the fingerprint sensing lines. The switch circuit is configured to receive the fingerprint sensing signals from the fingerprint sensing lines. The control circuit controls the switch circuit to select the part of the fingerprint sensing lines for the fingerprint sensing operation. The second circuit includes a plurality of fingerprint sensing channels coupled to the switch circuit. The fingerprint sensing channels receive the fingerprint sensing signals from the part of the fingerprint sensing lines.

In an embodiment of the invention, a number of the fingerprint sensing lines is larger than a number of the fingerprint sensing channels.

In an embodiment of the invention, the switch circuit includes a plurality of switches. The control circuit controls the switch circuit to turn on a part of the plurality of switches corresponding to the part of the fingerprint sensing lines to establish coupling between the part of the fingerprint sensing lines and the fingerprint sensing channels for the fingerprint sensing operation.

In an embodiment of the invention, the control circuit controls the switch circuit to turn off the rest of the plurality of switches corresponding to the rest of the fingerprint sensing lines that is not selected.

In an embodiment of the invention, the electronic circuit is implemented in a single semiconductor chip.

In an embodiment of the invention, the electronic circuit is implemented in at least two semiconductor chips. A first semiconductor chip includes the first circuit, and a second semiconductor chip includes the second circuit.

In an embodiment of the invention, the first semiconductor chip further includes at least a part of the control circuit and the second semiconductor chip further includes the switch circuit.

In an embodiment of the invention, the determined touch area includes a center line. The middle fingerprint sensing line of the part of the fingerprint sensing lines is located on or near to the center line of the determined touch area.

In an embodiment of the invention, the fingerprint sensing signals carried on the part of the fingerprint sensing lines are read out by the second circuit at a time.

In an embodiment of the invention, the control circuit controls the second circuit to sense a plurality of fingerprint images. The fingerprint sensing channels are grouped into a plurality of parts, and each of the parts receives the fingerprint sensing signals of the corresponding fingerprint image.

In an embodiment of the invention, the fingerprint sensors are controlled by fingerprint scan lines. The control circuit is further configured to select a part of the fingerprint scan lines for the fingerprint sensing operation according to the determined touch area.

In an embodiment of the invention, the control circuit controls the second circuit to sense a plurality of fingerprint images via the same part of the fingerprint scan lines.

In an embodiment of the invention, the control circuit controls the second circuit to sense a plurality of fingerprint images via different parts of the fingerprint scan lines.

In an embodiment of the invention, the second circuit generates the fingerprint image according to the fingerprint sensing signals by a remapping operation.

In an embodiment of the invention, the fingerprint sensors include a plurality of optical fingerprint sensors distributed in the panel.

In an embodiment of the invention, the fingerprint sensing zone covers at least a portion of the at least one fingerprint image including sufficient fingerprint features for fingerprint identification.

In an embodiment of the invention, the fingerprint sensing zone covers a full range of the at least one fingerprint image.

The invention provides an electronic device including a panel and an electronic circuit. The panel includes touch sensors and fingerprint sensors. The electronic circuit is configurable to be coupled to the panel. The electronic circuit is adapted to receive touch sensing signals from the touch sensors and receive fingerprint sensing signals corresponding to at least one fingerprint image from the fingerprint sensors via fingerprint sensing lines of the panel. The electronic circuit includes a control circuit. The control circuit is configured to determine a touch area according to the touch sensing signals and select a part of the fingerprint sensing lines to form a fingerprint sensing zone for a fingerprint sensing operation according to the determined touch area. Each of the fingerprint sensing lines is selectable to be a boundary of the fingerprint sensing zone.

In an embodiment of the invention, the electronic circuit further includes a first circuit, a second circuit and a switch circuit. The first circuit is configured to receive the touch sensing signals from the touch sensors. The second circuit is configured to receive the fingerprint sensing signals from the fingerprint sensors via the fingerprint sensing lines. The switch circuit is coupled to the fingerprint sensing lines. The switch circuit is configured to receive the fingerprint sensing signals from the fingerprint sensing lines. The control circuit controls the switch circuit to select the part of the fingerprint sensing lines for the fingerprint sensing operation. The second circuit includes a plurality of fingerprint sensing channels coupled to the switch circuit. The fingerprint sensing channels receive the fingerprint sensing signals from the part of the fingerprint sensing lines.

In an embodiment of the invention, the number of the fingerprint sensing lines is larger than the number of the fingerprint sensing channels.

In an embodiment of the invention, the switch circuit includes a plurality of switches. The control circuit controls the switch circuit to turn on a part of the plurality of switches corresponding to the part of the fingerprint sensing lines to establish coupling between the part of the fingerprint sensing lines and the fingerprint sensing channels for the fingerprint sensing operation.

In an embodiment of the invention, the control circuit controls the switch circuit to turn off the rest of the plurality of switches corresponding to the rest of the fingerprint sensing lines that is not selected.

In an embodiment of the invention, the electronic circuit is implemented in a single semiconductor chip.

In an embodiment of the invention, the electronic circuit is implemented in at least two semiconductor chips. A first semiconductor chip includes the first circuit and a second semiconductor chip includes the second circuit.

In an embodiment of the invention, the first semiconductor chip further includes at least a part of the control circuit and the second semiconductor chip further includes the switch circuit.

In an embodiment of the invention, the determined touch area includes a center line. A middle fingerprint sensing line of the part of the fingerprint sensing lines is located on or near to the center line of the determined touch area.

In an embodiment of the invention, the fingerprint sensing signals carried on the part of the fingerprint sensing lines are read out by the second circuit at a time.

In an embodiment of the invention, the control circuit controls the second circuit to sense a plurality of fingerprint images. The fingerprint sensing channels are grouped into a plurality of parts, and each of the parts receives the fingerprint sensing signals of the corresponding fingerprint image.

In an embodiment of the invention, the panel includes a scan circuit. The scan circuit is configured to control the fingerprint sensors by fingerprint scan lines. The control circuit is further configured to select a part of the fingerprint scan lines for the fingerprint sensing operation according to the determined touch area.

In an embodiment of the invention, the control circuit controls the second circuit to sense a plurality of fingerprint images via the same part of the fingerprint scan lines.

In an embodiment of the invention, the control circuit controls the second circuit to sense a plurality of fingerprint images via different parts of the fingerprint scan lines.

In an embodiment of the invention, the second circuit generates the fingerprint image according to the fingerprint sensing signals by a remapping operation.

In an embodiment of the invention, the fingerprint sensors include a plurality of optical fingerprint sensors distributed in the panel.

In an embodiment of the invention, the fingerprint sensing zone covers at least a portion of the at least one fingerprint image comprising sufficient fingerprint features for fingerprint identification.

In an embodiment of the invention, the fingerprint sensing zone covers a full range of the at least one fingerprint image.

The invention provides a method for sensing at least one fingerprint image adapted to a panel including touch sensors and fingerprint sensors. The fingerprint sensors are coupled to fingerprint sensing lines. The method includes: determining a touch area according to touch sensing signals from the touch sensors; selecting a part of the fingerprint sensing lines to form a fingerprint sensing zone for a fingerprint sensing operation according to the determined touch area; and receiving fingerprint sensing signals via the part of the fingerprint sensing lines. Each of the fingerprint sensing lines is selectable to be a boundary of the fingerprint sensing zone.

In an embodiment of the invention, the method further includes: controlling a switch circuit to select the part of the fingerprint sensing lines for the fingerprint sensing operation.

In an embodiment of the invention, the switch circuit includes a plurality of switches, and the step of controlling the switch circuit to select the part of the fingerprint sensing lines for the fingerprint sensing operation includes: controlling the switch circuit to turn on a part of the plurality of switches corresponding to the part of the fingerprint sensing lines; and controlling the switch circuit to turn off the rest of the plurality of switches corresponding to the rest of the fingerprint sensing lines that is not selected.

In an embodiment of the invention, the fingerprint sensors are further coupled to fingerprint scan lines. The method further includes: selecting a part of the fingerprint scan lines for the fingerprint sensing operation according to the determined touch area.

In an embodiment of the invention, the method further includes: generating the fingerprint image according to the fingerprint sensing signals by a remapping operation.

The invention provides an electronic circuit including a touch control circuit, a fingerprint sensing circuit and a switch circuit. The touch control circuit is configured to receive touch sensing signals from a panel and determine a touch area according to the touch sensing signals. The fingerprint sensing circuit is configured to receive fingerprint sensing signals corresponding to at least one fingerprint image from fingerprint sensors disposed in the panel via fingerprint sensing lines. The switch circuit is coupled to the fingerprint sensing circuit. The switch circuit is configured to be coupled to a part of the fingerprint sensing lines that is selected to form a fingerprint sensing zone for a fingerprint sensing operation according to the determined touch area. Each of the fingerprint sensing lines is selectable to be a boundary of the fingerprint sensing zone.

In an embodiment of the invention, the touch control circuit controls the switch circuit to select the part of the fingerprint sensing lines to form the fingerprint sensing zone for the fingerprint sensing operation according to the determined touch area.

In an embodiment of the invention, the fingerprint sensing circuit includes a plurality of fingerprint sensing channels coupled to the switch circuit. The fingerprint sensing channels receive the fingerprint sensing signals from the part of the fingerprint sensing lines.

In an embodiment of the invention, a number of the fingerprint sensing lines is larger than a number of the fingerprint sensing channels.

In an embodiment of the invention, the switch circuit includes a plurality of switches. The touch control circuit controls the switch circuit to turn on a part of the plurality of switches corresponding to the part of the fingerprint sensing lines to establish coupling between the part of the fingerprint sensing lines and the fingerprint sensing channels for the fingerprint sensing operation.

In an embodiment of the invention, the touch control circuit controls the switch circuit to turn off the rest of the plurality of switches corresponding to the rest of the fingerprint sensing lines that is not selected.

In an embodiment of the invention, the electronic circuit is implemented in a single semiconductor chip.

In an embodiment of the invention, the electronic circuit is implemented in at least two semiconductor chips. A first semiconductor chip includes at least a part of the touch control circuit and a second semiconductor chip includes the fingerprint sensing circuit.

In an embodiment of the invention, the second semiconductor chip further includes the switch circuit.

In an embodiment of the invention, the determined touch area includes a center line. A middle fingerprint sensing line of the part of the fingerprint sensing lines is located on or near to the center line of the determined touch area.

In an embodiment of the invention, the fingerprint sensing signals carried on the part of the fingerprint sensing lines are read out by the fingerprint sensing circuit at a time.

In an embodiment of the invention, the touch control circuit controls the fingerprint sensing circuit to sense a plurality of fingerprint images. The fingerprint sensing channels are grouped into a plurality of parts, and each of the parts receives the fingerprint sensing signals of the corresponding fingerprint image.

In an embodiment of the invention, the fingerprint sensors are controlled by fingerprint scan lines. The touch control circuit is further configured to select a part of the fingerprint scan lines for the fingerprint sensing operation according to the determined touch area.

In an embodiment of the invention, the touch control circuit controls the fingerprint sensing circuit to sense a plurality of fingerprint images via the same part of the fingerprint scan lines.

In an embodiment of the invention, the touch control circuit controls the fingerprint sensing circuit to sense a plurality of fingerprint images via different parts of the fingerprint scan lines.

In an embodiment of the invention, the fingerprint sensing circuit generates the fingerprint image according to the fingerprint sensing signals by a remapping operation.

In an embodiment of the invention, the fingerprint sensors include a plurality of optical fingerprint sensors distributed in the panel.

In an embodiment of the invention, the fingerprint sensing zone covers at least a portion of the at least one fingerprint image comprising sufficient fingerprint features for fingerprint identification.

In an embodiment of the invention, the fingerprint sensing zone covers a full range of the at least one fingerprint image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
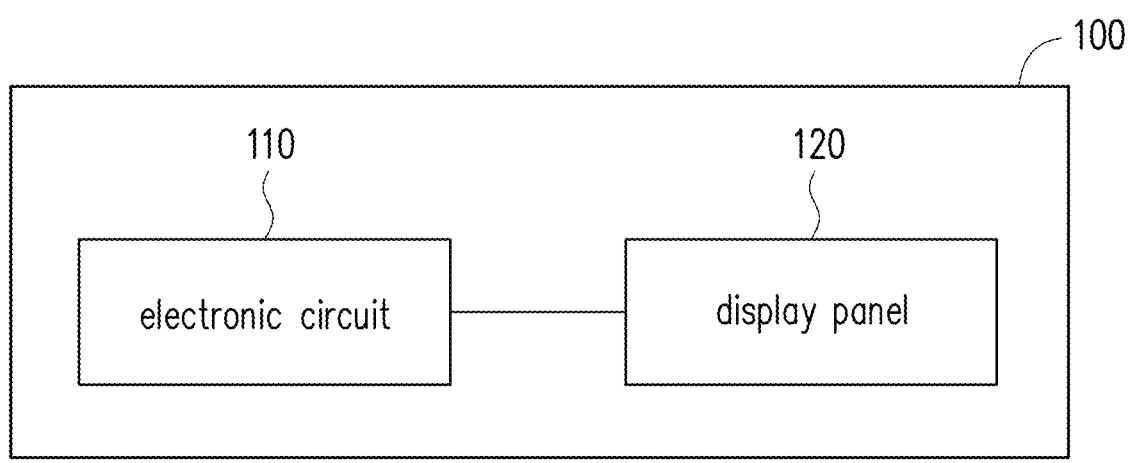
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes touch sensors and fingerprint sensors. The electronic circuit 110 is configurable to be coupled to the display panel 120. The electronic circuit 110 is adapted to drive the display panel 120.

In the present embodiment, the electronic device 100 may be an electronic device having a display function, a touch sensing function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
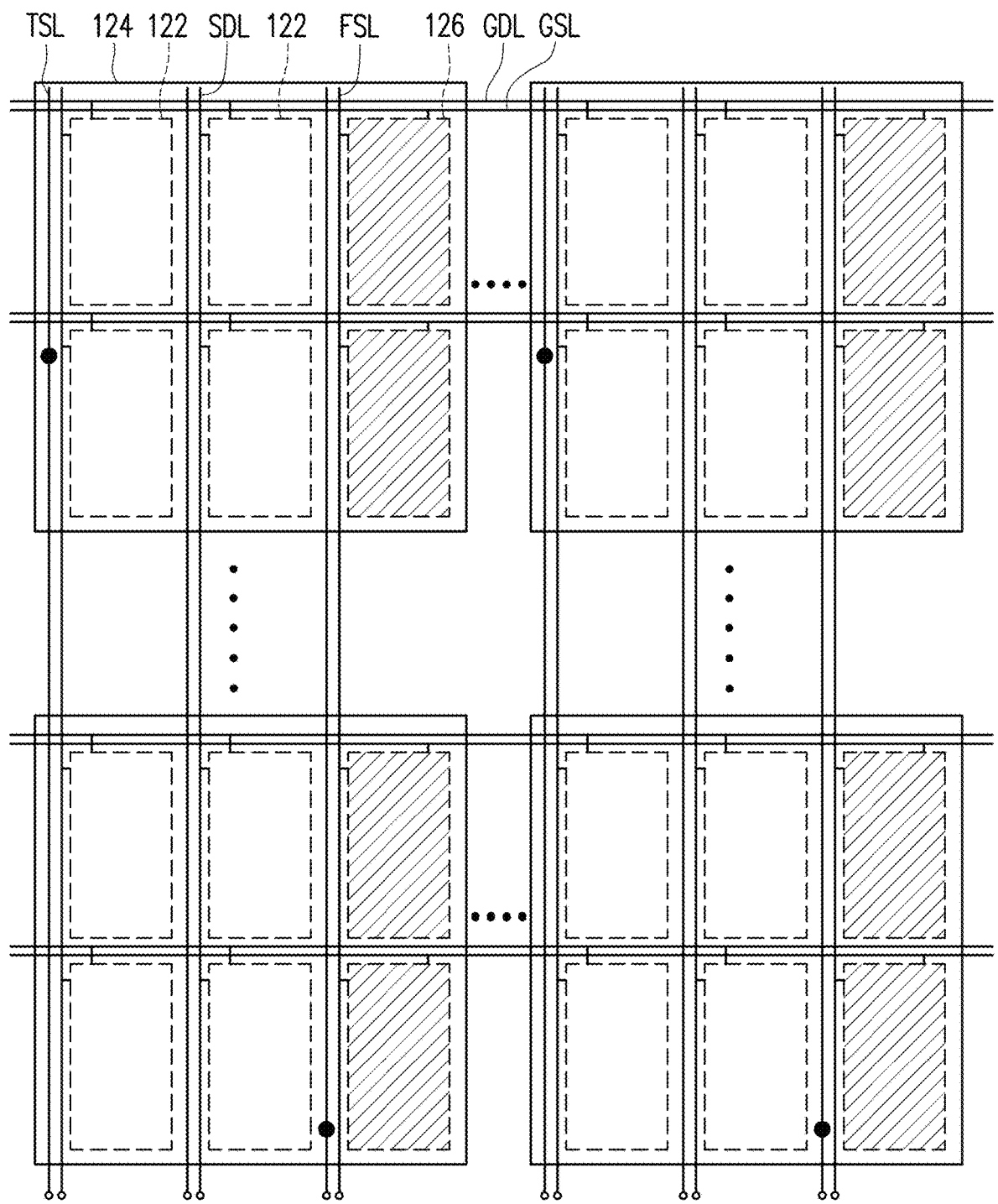
FIG. 2 is a schematic diagram illustrating the display panel depicted in FIG. 1.

FIG. 2 is a schematic diagram illustrating the display panel depicted in FIG. 1. Referring to FIG. 2, the display panel 120 of the present embodiment includes a plurality of display pixels 122, a plurality of touch sensors 124 and a plurality of fingerprint sensors 126. The electronic circuit 110 drives and controls the display panel 120 to perform a display operation, a touch sensing operation and a fingerprint sensing operation. To be specific, the electronic circuit 110 drives and controls the display pixels 122 to display images via display scan lines GDL and display data lines SDL. The electronic circuit 110 also drives and controls the touch sensors 124 to sense a touch event of the display panel 120 via touch scan lines and touch sensing lines TSL. In an embodiment, the touch sensors 124 may be touch sensing electrodes in a touch sensing phase, and the touch sensors 124 may be common electrodes in a display phase. In the present embodiment, in-cell touch sensors are depicted in FIG. 2 as an example. For the in-cell touch sensors, the display panel 120 inherently has no touch scan lines. For other type touch sensors, the display panel 120 may have touch scan lines for transmitting touch driving signals. The electronic circuit 110 also drives and controls the fingerprint sensors 126 to sense a fingerprint image on the display panel 120 via fingerprint scan lines GSL and fingerprint sensing lines FSL.

In an embodiment, the display panel 120 may be an in-cell fingerprint, touch and display panel that the fingerprint sensors and the touch sensors are embedded, but the invention is not limited thereto. In an embodiment, the electronic circuit 110 may drive and control the electronic device 100 to perform an in-display fingerprint identification operation, i.e. fingerprint recognition operation. In an embodiment, the fingerprint sensors 126 may be optical fingerprint sensors.

Figure 3:
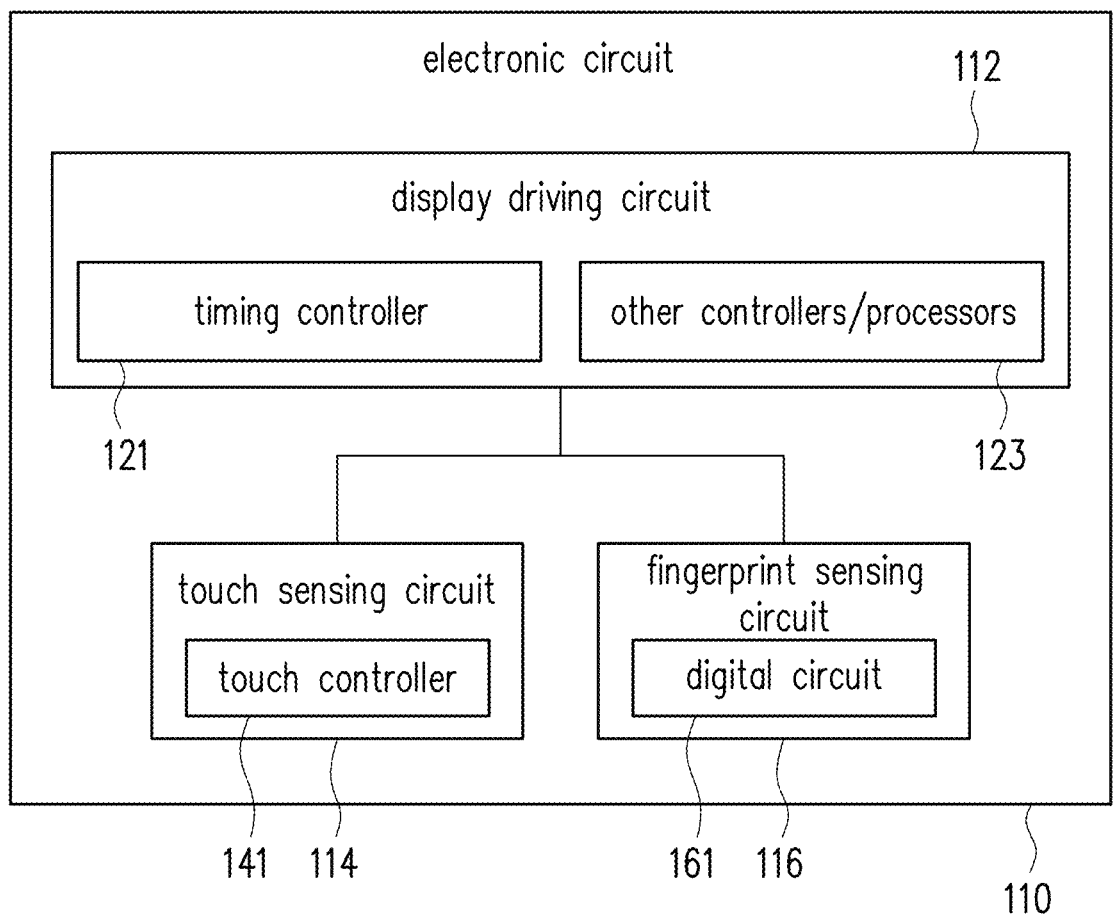
FIG. 3 is a schematic block diagram illustrating the electronic circuit depicted in FIG. 1.

FIG. 3 is a schematic block diagram illustrating the electronic circuit depicted in FIG. 1. Referring to FIG. 3, the electronic circuit 110 may include a display driving circuit 112, a fingerprint sensing circuit 116 and a touch sensing circuit 114. The display driving circuit 112 is configured to drive and control the display pixels 122 to display images via the display scan lines GDL and the display data lines SDL. The display driving circuit 112 generates display driving signals for driving the display data lines SDL of the display panel 120. The display driving circuit 112 may include a timing controller 121, a display driver and other functional circuits for the display operation. The display driving circuit 112 may also include other controllers or processors 123 for other control activities of the display operation. The touch sensing circuit 114 is configured to drive and control the touch sensors 124 to sense the touch event of the display panel 120 via the touch sensing lines TSL. The touch sensing circuit 114 may include a touch controller 141, an analog front end (AFE) circuit, an analog-to-digital converter (ADC) circuit and other functional circuits for the touch sensing operation. The fingerprint sensing circuit 116 is configured to drive and control the fingerprint sensors 126 to sense the fingerprint on the display panel 120 via the fingerprint scan lines GSL and the fingerprint sensing lines FSL. The fingerprint sensing circuit 116 receives fingerprint sensing signals corresponding to a fingerprint image from the fingerprint sensors 126 and may also process the fingerprint sensing signals to obtain the fingerprint image. The fingerprint sensing circuit 116 may include a digital circuit 161, an AFE circuit, an ADC circuit and other functional circuits for the fingerprint sensing operation.

In an embodiment, when the electronic circuit 110 is implemented as a single chip integrated circuit that can drive and control the display panel 120 to perform the display operation, the touch sensing operation and the fingerprint sensing operation, the electronic circuit 110 may include a control circuit 130, and the control circuit 130 may be a micro-controller based core to perform all of control activities of the display operation, the touch sensing operation and the fingerprint sensing operation. The control circuit 130 may include at least one of the timing controller 121, the touch controller 141, the digital circuit 161, and the other controllers or processors 123 of the display driving circuit 112.

The display driving circuit 112, the touch sensing circuit 114 and the fingerprint sensing circuit 116 communicate with one another via signal transmission interfaces, such as Mobile Industry Processor Interface (MIPI), Inter-Integrated Circuit (I2C) Interface, Serial Peripheral Interface (SPI) and/or other similar or suitable interfaces.

Regarding hardware structures of the components in the embodiment of FIG. 3, the timing controller 121, the touch controller 141 and the digital circuit 161 may be a processor having computational capability. Alternatively, the timing controller 121, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the display driving circuit 112, the touch sensing circuit 114 and the fingerprint sensing circuit 116 can be obtained with reference to common knowledge in the related art, which is not repeated hereinafter.

Figure 4:
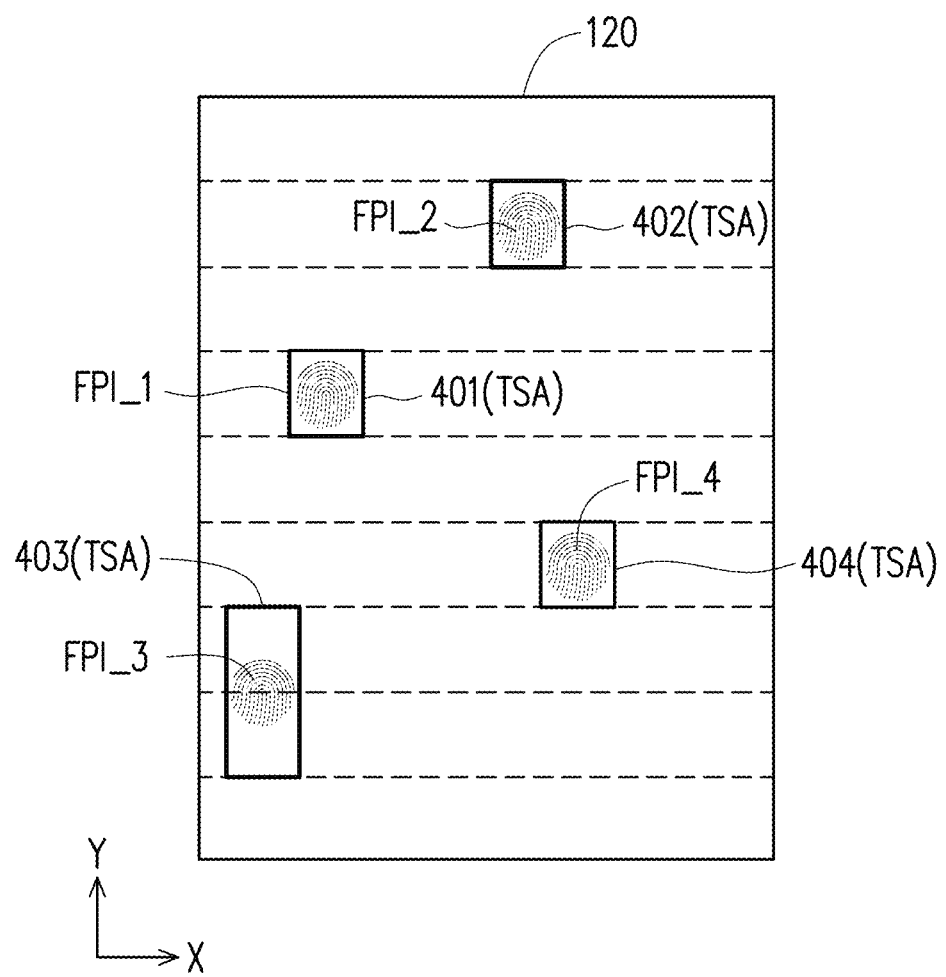
FIG. 4 is a schematic diagram illustrating a display panel operating for fingerprint sensing according to an embodiment of the invention.
Figure 18:
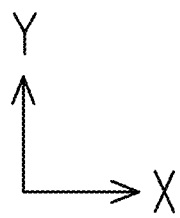
FIG. 18 illustrates two display panels that are respectively divided into a plurality of fingerprint sensing zones of different sizes in the fingerprint sensing direction X in the related art.
Figure 18:
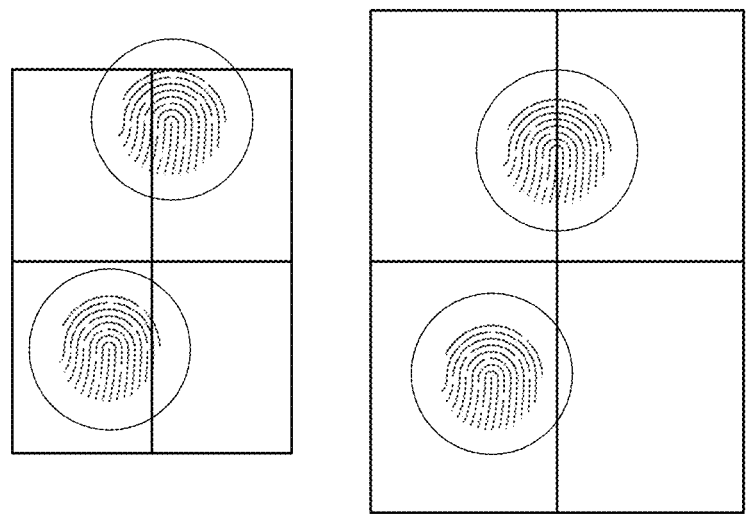

FIG. 4 is a schematic diagram illustrating a display panel operating for fingerprint sensing according to an embodiment of the invention. Referring to FIG. 1, FIG. 3 and FIG. 4, the electronic circuit 110 may drive and control the display panel 120 to sense one or more fingerprint images FPI_1, FPI_2, FPI_3 and FPI_4 on the display panel 120. In the present embodiment, the fingerprint sensing lines FSL extend in the direction Y, e.g. the vertical direction and arranged in the direction X, e.g. the horizontal direction, as shown in FIG. 2. The display panel 120 is not fixedly partitioned into fingerprint sensing zones for fingerprint sensing in the direction X in advance. That is to say, the display panel 120 has no predetermined fingerprint sensing zones for the fingerprint sensing lines FSL in the arrangement direction X. In related art as illustrated in FIG. 18, the display panel is fixedly partitioned into fingerprint sensing zones for fingerprint sensing in the direction X in advance. The fingerprint sensing zones 401, 402, 403 and 404 of the present embodiment can be flexibly formed for fingerprint sensing by selecting a part of the fingerprint sensing lines FSL among a plurality of the fingerprint sensing lines FSL arranged all over the display panel 120. Each of the fingerprint sensing lines FSL is selectable to be boundaries of the fingerprint sensing zones 401, 402, 403 and 404.

Figure 5:
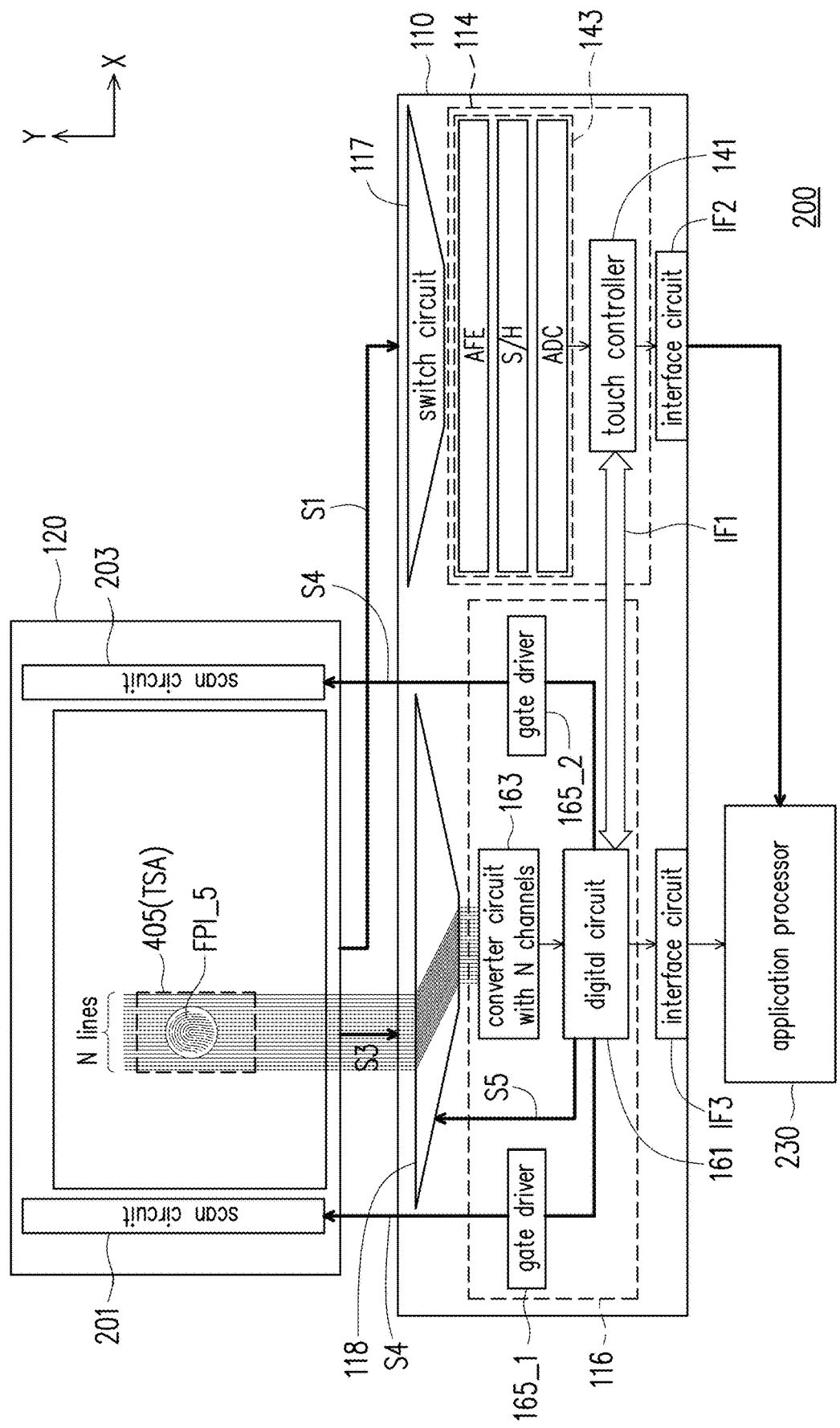
FIG. 5 is a schematic block diagram illustrating an electronic device according to another embodiment of the invention.

To be specific, a control circuit of the touch sensing circuit 114, e.g. a touch controller, determines one or more touch areas TSA corresponding to the fingerprint image FPI_1, FPI_2, FPI_3 and FPI_4 according to a touch sensing signal. The touch controller 141 (as illustrated in FIG. 5) may determine a range for each of the touch areas TSA. Alternatively, the touch controller 141 may simply determine coordinate information indicating a location of each of the touch areas TSA and informs the fingerprint sensing circuit 116 of the coordinate information. The determined touch area TSA defines a fingerprint sensing zone for covering a fingerprint image. The fingerprint sensing zone may cover a portion or a full range of the fingerprint image. The portion or the full range of the input fingerprint image includes sufficient fingerprint features for fingerprint identification. The touch controller informs the fingerprint sensing circuit 116 to select a part of the fingerprint sensing lines FSL and a part of the fingerprint scan lines GSL for the fingerprint sensing operation according to the determined touch area TSA. A part of the fingerprint sensing lines FSL collocated with the touch area TSA on the display panel 120 is selected among a plurality of the fingerprint sensing lines FSL arranged all over the display panel 120. In the present embodiment, the selected part of fingerprint sensing lines FSL may flexibly form a single fingerprint sensing zone 401, 402, 403 or 404 having a range determined by the touch area TSA, such that only a single-turn receiving of fingerprint sensing signals in fingerprint sensing channels is required for the horizontal direction (X direction) of the fingerprint image FPI_1, FPI_2, FPI_3 or FPI_4. It is thus to solve cross zone problem in receiving the fingerprint sensing signals of a fingerprint image FPI_1, FPI_2, FPI_3 or FPI_4 in the horizontal direction. The time for fingerprint sensing is thus reduced.

FIG. 5 is a schematic block diagram illustrating an electronic device according to another embodiment of the invention. Referring to FIG. 5, the electronic device 200 of the present embodiment includes the electronic circuit 110, the display panel 120 and an application processor 230. The electronic circuit 110 includes the touch sensing circuit 114, the fingerprint sensing circuit 116, a plurality of interface circuits IF1, IF2 and IF3 and a plurality of switch circuits 117 and 118. The first interface circuit IF1 includes circuits for transmitting and receiving signals arranged in the touch sensing circuit 114 and/or the fingerprint sensing circuit 116. The touch sensing circuit 114 communicates with the fingerprint sensing circuit 116 via the first interface circuit IF1. The second interface circuit IF2 is coupled between the touch sensing circuit 114 and the application processor 230. The touch sensing circuit 114 transmits touch information to the application processor 230 via the second interface circuit IF2. For simplicity and clarity, the display driving circuit 112 is not depicted in details in FIG. 5.

The display panel 120 includes scan circuits 201 and 203. The scan circuits 201 and 203 are coupled to the fingerprint sensors 126 via the fingerprint scan lines GSL. The fingerprint scan lines GSL (not shown in FIG. 5) extend in the direction X. The scan circuits 201 and 203 are configured to initiate a fingerprint scanning to a fingerprint sensing zone 405 via the corresponding fingerprint scan lines GSL, so as to control the fingerprint sensors 126 of the fingerprint sensing zone 405 to perform the fingerprint sensing operation.

In the present embodiment, the electronic circuit 110 co-operates with the display panel 120 and the application processor 230 for a fingerprint identification operation, i.e. a fingerprint recognition operation or fingerprint authentication operation. The third interface circuit IF3 is coupled between the fingerprint sensing circuit 116 and the application processor 230. The fingerprint sensing circuit 116 outputs a fingerprint image to the application processor 230 to perform the fingerprint identification operation via the third interface circuit IF3. Enough teaching, suggestion, and implementation illustration for the fingerprint identification operation can be obtained with reference to common knowledge in the related art, which is not repeated hereinafter. In addition, the interface circuits IF1, IF2 and IF3 may be Mobile Industry Processor Interfaces (MIPI), Inter-Integrated Circuit (I2C) Interfaces, Serial Peripheral Interfaces (SPI) and/or other similar or suitable interfaces, but the invention is not limited thereto.

The touch sensing circuit 114 is configured to receive a touch sensing signal S1 from the touch sensors 124. The touch sensing circuit 114 includes a touch controller 141 and a converter circuit 143. The converter circuit 143 includes an analog front end (AFE) circuit, a sample and hold (S/H) circuit and an analog-to-digital converter (ADC) circuit. The converter circuit 143 receives the touch sensing signal S1 from the touch sensors 124 via the switch circuit 117. The switch circuit 117 is for multiplexing touch sensing signals S1 and display driving signals in respective touch sensing phases and display driving phases. The converter circuit 143 converts the touch sensing signal S1 of an analog format into the touch sensing signal S1 of a digital format and transmits the touch sensing signal S1 of the digital format to the touch controller 141. Enough teaching, suggestion, and implementation illustration for the operation and hardware structures of the converter circuit 143 can be obtained with reference to common knowledge in the related art, which is not repeated hereinafter.

The touch controller 141 receives the touch sensing signal S1 from the converter circuit 143. The touch controller 141 determines the touch area TSA according to the touch sensing signal S1. In the present embodiment, the touch area TSA may correspond to N fingerprint sensing channels in the X direction and cover a plurality of fingerprint scan zones in the Y direction. The touch controller 141 informs the fingerprint sensing circuit 116 to select a part of the fingerprint sensing lines FSL and a part of the fingerprint scan lines GSL for fingerprint sensing operation according to the determined touch area TSA. For example, the fingerprint sensing lines FSL and the fingerprint scan lines GSL corresponding to the fingerprint sensing zone 405 are selected to perform the fingerprint sensing operation. In the present embodiment, the number of the selected fingerprint sensing channels is N, where N is a positive integer.

The fingerprint sensing circuit 116 is configured to receive a fingerprint sensing signal S3 corresponding to a fingerprint image FPI_5 from the fingerprint sensors 126 via the selected part of the fingerprint sensing lines FSL and the switch circuit 118. The fingerprint sensing circuit 116 includes a digital circuit 161, a converter circuit 163 and gate drivers 165_1 and 165_2.

The converter circuit 163 converts the fingerprint sensing signal S3 of an analog format into the fingerprint sensing signal S3 of a digital format and transmits the fingerprint sensing signal S3 of the digital format to the digital circuit 161. The converter circuit 163 includes a plurality of fingerprint sensing channels coupled to the switch circuit 118. The fingerprint sensing channels receive the corresponding fingerprint sensing signal S3 from the selected part of the fingerprint sensing lines FSL. Preferably, the fingerprint sensing signal S3 carried on the selected part of the fingerprint sensing lines FSL is read out and received by the fingerprint sensing channels at a time. Each of the fingerprint sensing channels may include an AFE circuit and/or an ADC circuit. In the present embodiment, the converter circuit 163 may include N fingerprint sensing channels, and the display panel 120 may include M fingerprint sensing lines FSL, where N and M are positive integers, and M is larger than N. That is to say, the number of the fingerprint sensing lines FSL is larger than the number of the fingerprint sensing channels. Enough teaching, suggestion, and implementation illustration for the operation and hardware structures of the converter circuit 163 can be obtained with reference to common knowledge in the related art, which is not repeated hereinafter.

Figure 6:
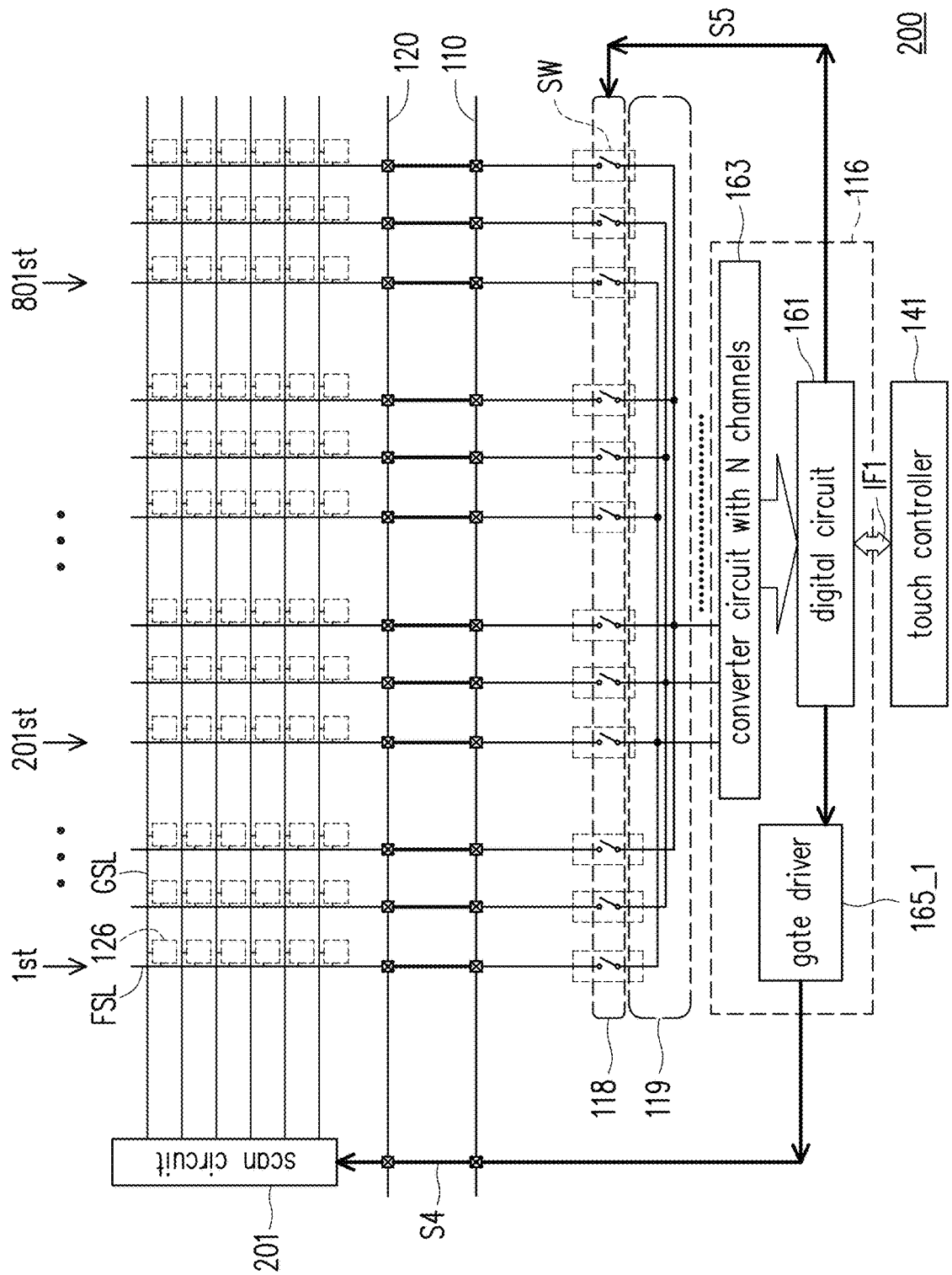
FIG. 6 is a schematic diagram illustrating a detail structure of the switch circuit 118 depicted in FIG. 5 according to an embodiment of the invention.

The touch controller 141 communicates with the digital circuit 161 via the first interface circuit IF1. The digital circuit 161 controls the switch circuit 118 to select a part of the fingerprint sensing lines for the fingerprint sensing operation via a control signal S5. For example, N fingerprint sensing lines collocated with the touch area TSA on the display panel 120 is selected among M fingerprint sensing lines arranged all over the display panel 120. The switch circuit 118 is coupled to the fingerprint sensors 126 via the fingerprint sensing lines FSL. The switch circuit 118 is configured to receive the fingerprint sensing signal S3 from the fingerprint sensors 126 via the selected fingerprint sensing lines FSL. The switch circuit 118 may include a plurality of switches, and each of the switches corresponds to a fingerprint sensing line FSL as depicted in FIG. 6. The digital circuit 161 controls the switch circuit 118 to turn on a part of the plurality of switches corresponding to the N fingerprint sensing lines to establish coupling between the N fingerprint sensing lines and the N fingerprint sensing channels for the fingerprint sensing operation. On the other hand, the digital circuit 161 controls the switch circuit 118 to turn off the rest of the plurality of switches corresponding to the rest of the fingerprint sensing lines that is not selected. For example, the switches corresponding to the unselected M-N fingerprint sensing lines are turned off.

The digital circuit 161 controls the gate drivers 165_1 and 165_2 to drive the scan circuits 201 and 203 to initiate the fingerprint scanning to the fingerprint sensing zone 405 via a driving signal S4. In an embodiment, the display panel 120 may simply include a gate driver, and the number of the gate drivers does not intend to limit the invention. Enough teaching, suggestion, and implementation illustration for the operation and hardware structures of the gate drivers 165_1 and 165_2 and the scan circuits 201 and 203 can be obtained with reference to common knowledge in the related art, which is not repeated hereinafter.

In the present embodiment, the determined touch area TSA defines the fingerprint sensing zone 405 for covering a fingerprint image. A part of the fingerprint sensing lines FSL and a part of the fingerprint scan lines GSL are selected for fingerprint sensing operation according to the determined touch area TSA. A part of switches corresponding to the part of fingerprint sensing lines FSL is turned on to couple the part of fingerprint sensing lines FSL to the fingerprint sensing channels to have the fingerprint sensing channels receive the fingerprint sensing signal S3. A part of the fingerprint sensing lines FSL collocated with the touch area TSA on the display panel 120 is selected among a plurality of the fingerprint sensing lines FSL arranged all over the display panel 120. In the present embodiment, the selected part of fingerprint sensing lines FSL may flexibly form a single fingerprint sensing zone 405 having a range determined by the touch area TSA, and the fingerprint sensing signals S3 carried on the selected part of fingerprint sensing lines FSL may be read out at a time, such that only a single-turn receiving of fingerprint sensing signals in fingerprint sensing channels is required for the horizontal direction X of the fingerprint image FPI_5. The time for fingerprint sensing is thus reduced.

In an embodiment, the electronic circuit 110 is implemented in a single semiconductor chip. In an embodiment, the electronic circuit 110 is implemented in at least two semiconductor chips. The at least two semiconductor chips include a first semiconductor chip and a second semiconductor chip. The first semiconductor chip includes the touch sensing circuit 114. The second semiconductor chip includes the fingerprint sensing circuit 116. The second semiconductor chip may also include the switch circuit 118.

Regarding hardware structures of the components in the embodiment of FIG. 5, the touch controller 141 and the digital circuit 161 may be processors having computational capability. Alternatively, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC).

FIG. 6 is a schematic diagram illustrating a detail structure of the switch circuit 118 depicted in FIG. 5 according to an embodiment of the invention. Referring to FIG. 6, the switch circuit 118 is controlled by the digital circuit 161. The switch circuit 118 includes a plurality of switches SW. The switches SW can be separately controlled. The digital circuit 161 determines which switches to be turned on or turned off according to the touch area TSA. The switches SW that are turned on establish the coupling between the fingerprint sensing lines FSL and the fingerprint sensing channels for the fingerprint sensing operation.

In the present embodiment, the electronic circuit 110 further includes a wire circuit 119 coupled between the switch circuit 118 and the converter circuit 163 for reducing the circuit area. The wire circuit 119 groups the fingerprint sensing lines FSL into a plurality of groups, and the groups are correspondingly connected to the fingerprint sensing channels in the converter circuit 163. For example, the converter circuit 163 may be designed to have 200 fingerprint sensing channels, and the number of the fingerprint sensing lines FSL is 1000. The first fingerprint sensing line, the $201^{th}$ fingerprint sensing line, the $401^{th}$ fingerprint sensing line, the $601^{th}$ fingerprint sensing line and the $801^{th}$ fingerprint sensing line are connected with one another in the same group via the corresponding switches SW and the wire circuit 119 and coupled to the first fingerprint sensing channel. Similarly, the second fingerprint sensing line, the $202^{th}$ fingerprint sensing line, the $402^{th}$ fingerprint sensing line, the $602^{th}$ fingerprint sensing line and the $802^{th}$ fingerprint sensing line are connected with one another in the same group via the corresponding switches SW and the wire circuit 119 and coupled to the second fingerprint sensing channel. The connection relationship of the rest fingerprint sensing lines and the rest fingerprint sensing channels can be deduced by analogy. By controlling the corresponding switches SW, the fingerprint sensing lines FSL in the same group are not shorted at the same time.

The number of the fingerprint sensing lines FSL, the number of the fingerprint sensing channels and the connection relationship of the fingerprint sensing lines FSL and the fingerprint sensing channels are disclosed for example, and the invention is not limited thereto.

Figure 7:
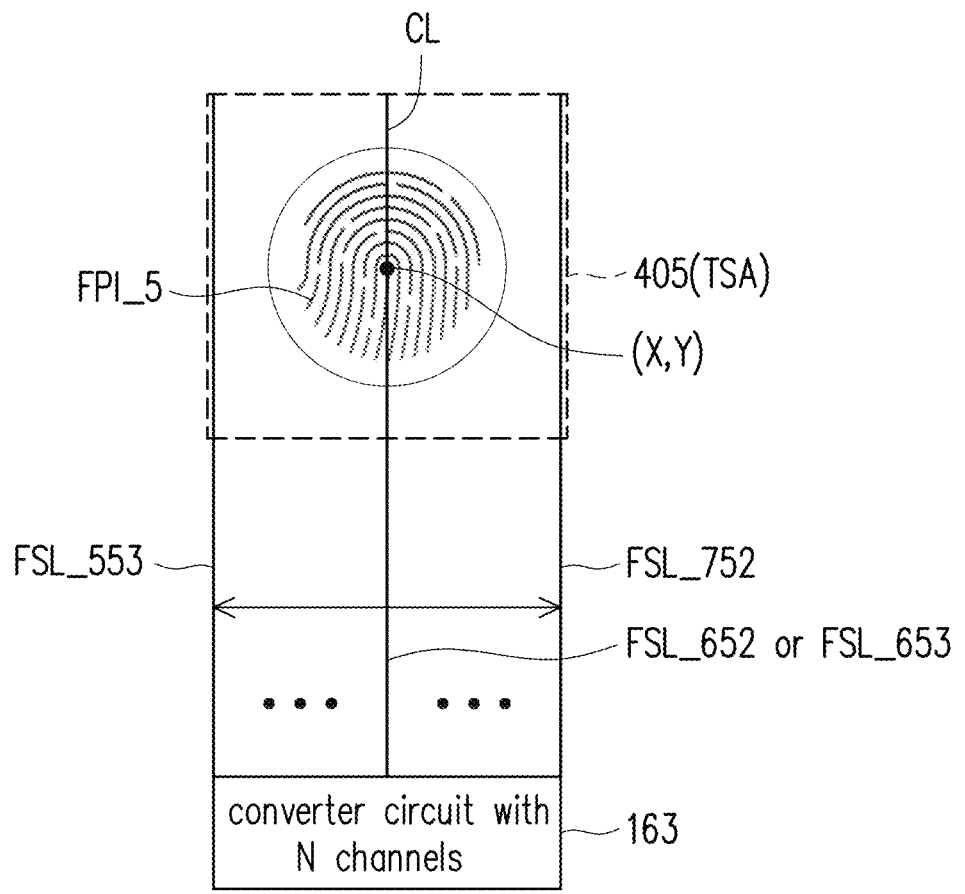
FIG. 7 is a schematic diagram illustrating a method for selecting the fingerprint sensing lines depicted in FIG. 5 according to an embodiment of the invention.

FIG. 7 is a schematic diagram illustrating a method for selecting the fingerprint sensing lines depicted in FIG. 5 according to an embodiment of the invention. Referring to FIG. 6 and FIG. 7, for example, the converter circuit 163 may be designed to have 200 fingerprint sensing channels, and the number of the fingerprint sensing lines FSL is 1000. When the touch controller 141 determines the touch area TSA with a coordinate (X, Y) of (652, 305) indicating a center or near center of the touch area and informs the digital circuit 161 of the coordinate information, the digital circuit 161 selects 200 fingerprint sensing lines FSL among 1000 fingerprint sensing lines FSL arranged all over the display panel 120 for fingerprint sensing, and each of the fingerprint sensing lines is selectable to be a boundary of the fingerprint sensing zone. For example, the digital circuit 161 controls the switch circuit 118 to select the $553^{th}$ fingerprint sensing line FSL_553 to the $752^{th}$ fingerprint sensing line FSL_752 to form the fingerprint sensing zone 405 for fingerprint sensing according to the X coordinate information of the touch area TSA, where the $553^{th}$ fingerprint sensing line FSL_553 and the $752^{th}$ fingerprint sensing line FSL_752 are selectable and selected to be boundaries of the fingerprint sensing zone 405. That is to say, the fingerprint sensing lines of the boundaries of the fingerprint sensing zone 405 are determined according to the touch area TSA.

In the present embodiment, the touch area TSA includes a full range of the fingerprint image FPI_5, and has a center vertical line CL passing through the center or near center of the touch area TSA. The middle fingerprint sensing line FSL_652 or FSL_653 of the selected fingerprint sensing lines FSL_553 to FSL_752 is located on or near to the center vertical line CL of the determined touch area TSA. In this case, the fingerprint sensing line FSL_652 is located on the center vertical line CL of the determined touch area TSA, and the fingerprint sensing line FSL_653 is near to the center vertical line CL of the determined touch area TSA.

On the other hand, according to the Y coordinate information of the determined touch area TSA, the digital circuit 161 further controls the gate drivers 165_1 and/or 165_2 to drive the scan circuits 201 and/or 203 to initiate the fingerprint scanning to the fingerprint sensing zone 405 via the driving signal S4.

Figure 8:
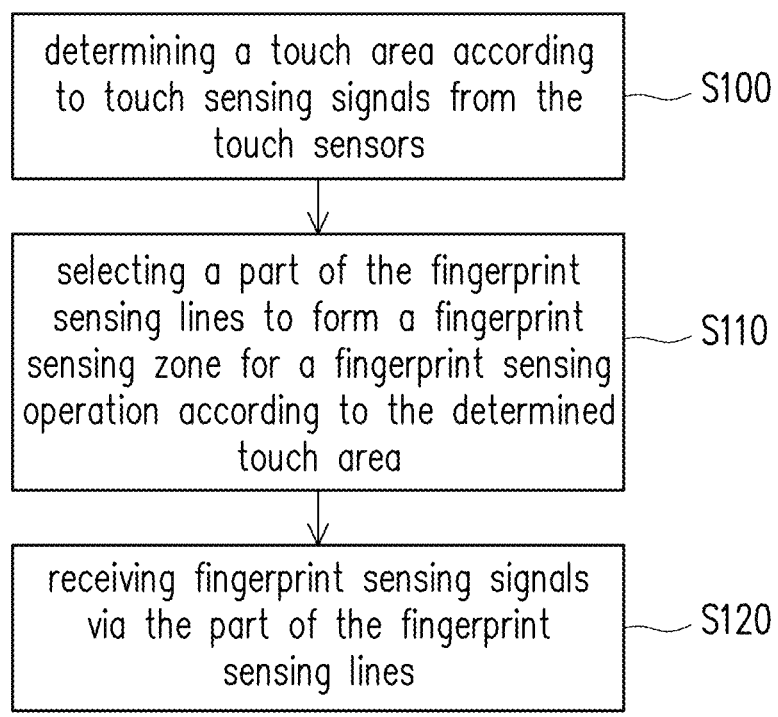
FIG. 8 is a flowchart illustrating steps in a method for sensing at least one fingerprint image according to an embodiment of the invention.

FIG. 8 is a flowchart illustrating steps in a method for sensing at least one fingerprint image according to an embodiment of the invention. Referring to FIG. 5 and FIG. 8, in the present embodiment, the method for sensing the at least one fingerprint image is at least adapted to the electronic device 200 depicted in FIG. 5, but the disclosure is not limited thereto. Taking the electronic device 200 for example, in step S100, the electronic circuit 110 determines a touch area TSA according to touch sensing signals S1 from the touch sensors 124. In step S110, the electronic circuit 110 selects a part of the fingerprint sensing lines FSL to form the fingerprint sensing zone 405 for the fingerprint sensing operation according to the determined touch area TSA. In step S120, the electronic circuit 110 receives fingerprint sensing signals S3 via the part of the fingerprint sensing lines FSL.

The method for sensing the at least one fingerprint image described in the embodiment of the invention is sufficiently taught, suggested, and embodied in the embodiments illustrated in FIG. 1 to FIG. 7, and therefore no further description is provided herein.

Figure 9:
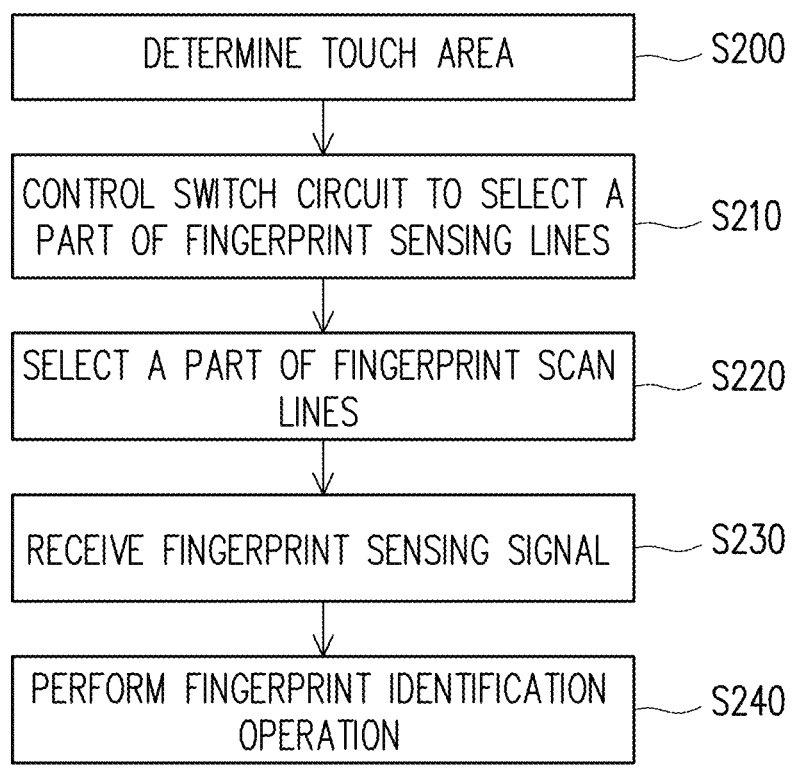
FIG. 9 is a flowchart illustrating steps in a method for fingerprint identification according to an embodiment of the invention.

FIG. 9 is a flowchart illustrating detail steps in a method for fingerprint identification according to an embodiment of the invention. Referring to FIG. 5 and FIG. 9, in the present embodiment, the method for fingerprint identification is at least adapted to the electronic device 200 depicted in FIG. 5, but the disclosure is not limited thereto. Taking the electronic device 200 for example, in step S200, the touch controller 141 performs a touch sensing operation to determine the touch area TSA according to the touch sensing signal S1 from the touch sensors 124. In step S210, the digital circuit 161 controls the switch circuit 118 to select a part of the fingerprint sensing lines FSL for the fingerprint sensing operation. In step S220, the digital circuit 161 selects a part of the fingerprint scan lines GSL for the fingerprint sensing operation according to the determined touch area TSA. In step S230, the digital circuit 161 receives the fingerprint sensing signal S3 via the part of the fingerprint sensing lines FSL. In step S240, the application processor 230 receives the fingerprint image from the digital circuit 161 and performs the fingerprint identification operation.

The method for fingerprint identification described of the embodiment of the invention is sufficiently taught, suggested, and embodied in the embodiments illustrated in FIG. 1 to FIG. 7, and therefore no further description is provided herein.

Figure 10A:
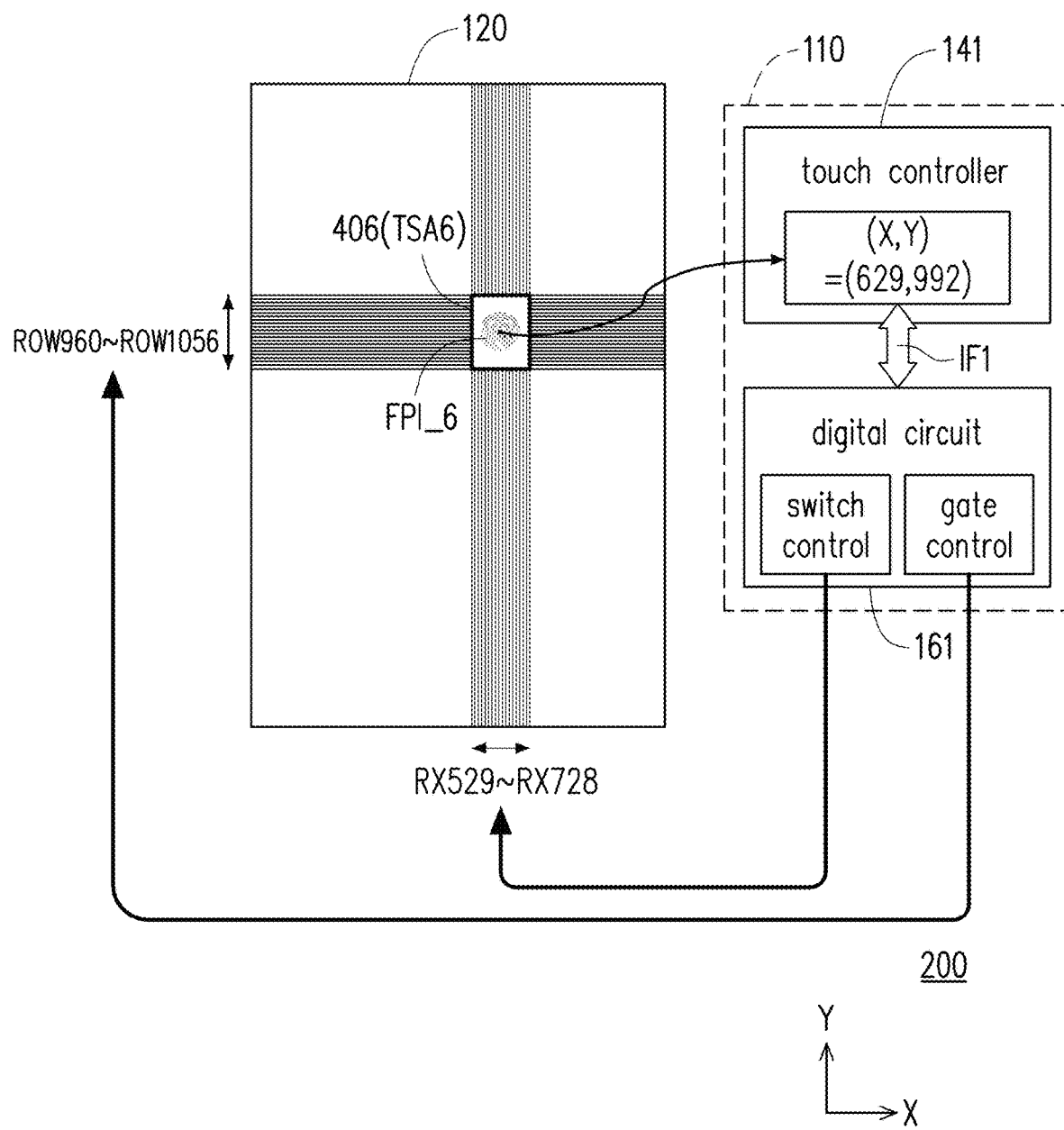
FIG. 10A and FIG. 10B are schematic diagrams illustrating a method for selecting the fingerprint sensing lines and the fingerprint scan lines according to an embodiment of the invention.
Figure 10B:
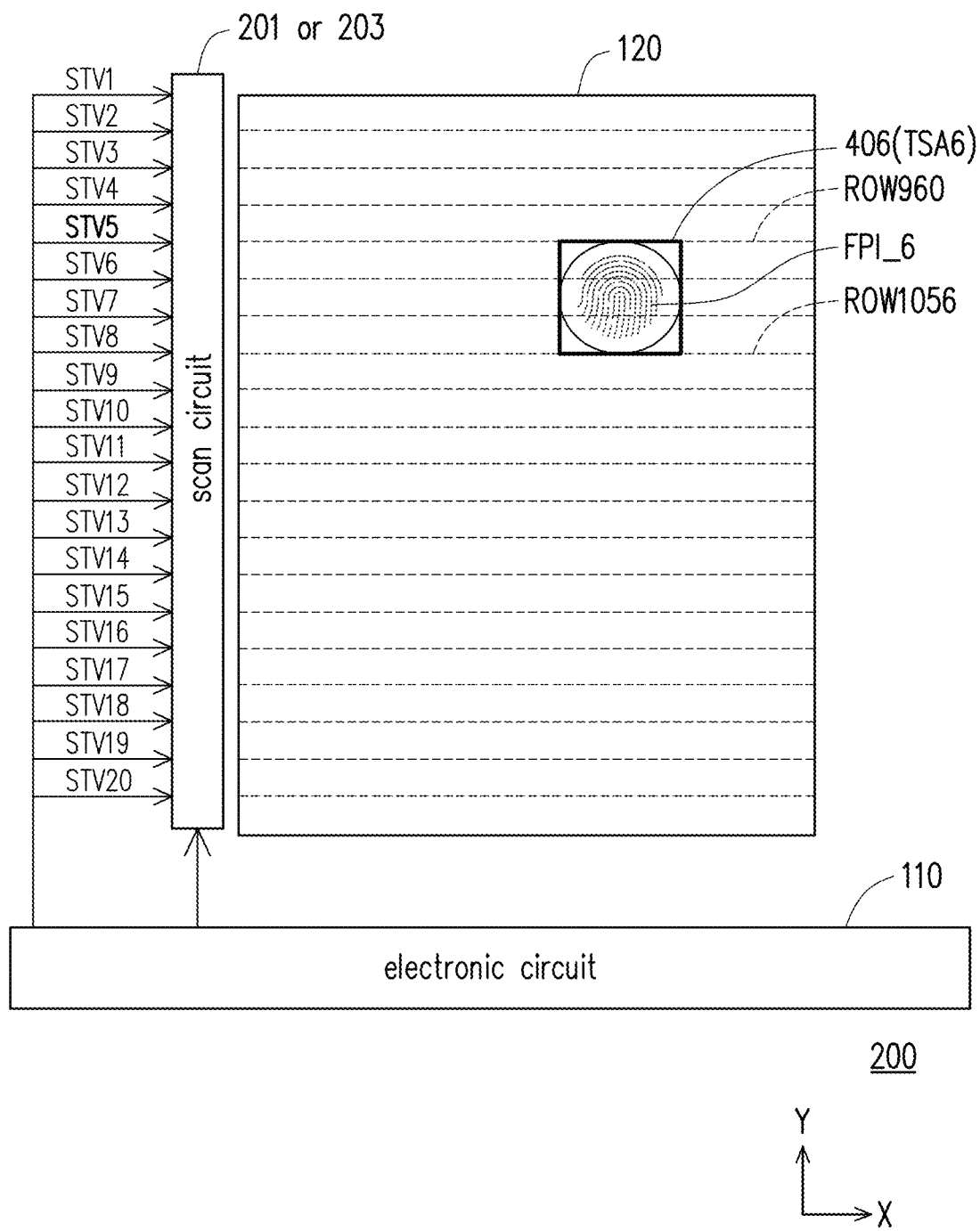

FIG. 10A and FIG. 10B are schematic diagrams illustrating a method for selecting the fingerprint sensing lines and the fingerprint scan lines according to an embodiment of the invention. Referring to FIG. 10A and FIG. 10B, the converter circuit 163 may be designed to have 200 fingerprint sensing channels, and the number of the fingerprint sensing lines FSL is 1000. The number of the fingerprint sensing lines FSL and the number of the fingerprint sensing channels are disclosed for example, and the invention is not limited thereto. The touch controller 141 determines the coordinate (X, Y) of the touch area TSA6 as (629, 992) and informs the digital circuit 161 of the coordinate information. The digital circuit 161 selects the fingerprint sensing lines RX529 to RX728 for sensing a fingerprint image FPI_6 via the switch circuit 118 according to the X coordinate information of the touch area TSA6, and the fingerprint sensing lines RX529 and RX728 are selected to be boundaries of the fingerprint sensing zone 406. Fingerprint sensing zones of the display panel 120 are not determined for each of the fingerprint sensing lines in advance. Therefore, the fingerprint sensing lines are flexibly selected to form the fingerprint sensing zone 406 having a range determined by the touch area TSA6. The digital circuit 161 selects and drives the fingerprint scan lines ROW960 to ROW1056 according to the Y coordinate information of the touch area TSA6. The fingerprint sensing signals carried on the fingerprint sensing lines RX529 to RX728 are read out at a time.

In FIG. 10B, the method for selecting the fingerprint scan lines ROW960 to ROW1056 is further described in detail. In the present embodiment, the display panel 120 includes a plurality of scan zones. The determined touch area TSA6 may cover over three scan zones which are located between the fingerprint scan lines ROW960 to ROW1056. The digital circuit 161 drives the gate drivers 165_1 and/or 165_2 as illustrated in FIG. 5 to output scan signals STV5 to STV7 to the scan circuits 201 and/or 203 according to the Y coordinate information of the touch area TSA6. The scan signals STV5 to STV7 respectively correspond to the three scan zones covered by the touch area TSA6 for the scan circuits 201 and/or 203 to initiate scanning of the fingerprint scan lines ROW960 to ROW1056. The number of the scan signals are disclosed for example, and the invention is not limited thereto. Responsive to the scan signals STV5 to STV7, the scan circuits 201 and/or 203 start to scan the fingerprint sensing zone 406 from the fingerprint scan lines ROW960 to ROW1056. The scan circuits 201 and/or 203 may complete the scan operation based on the scan signals STV5 and STV7.

Figure 11:
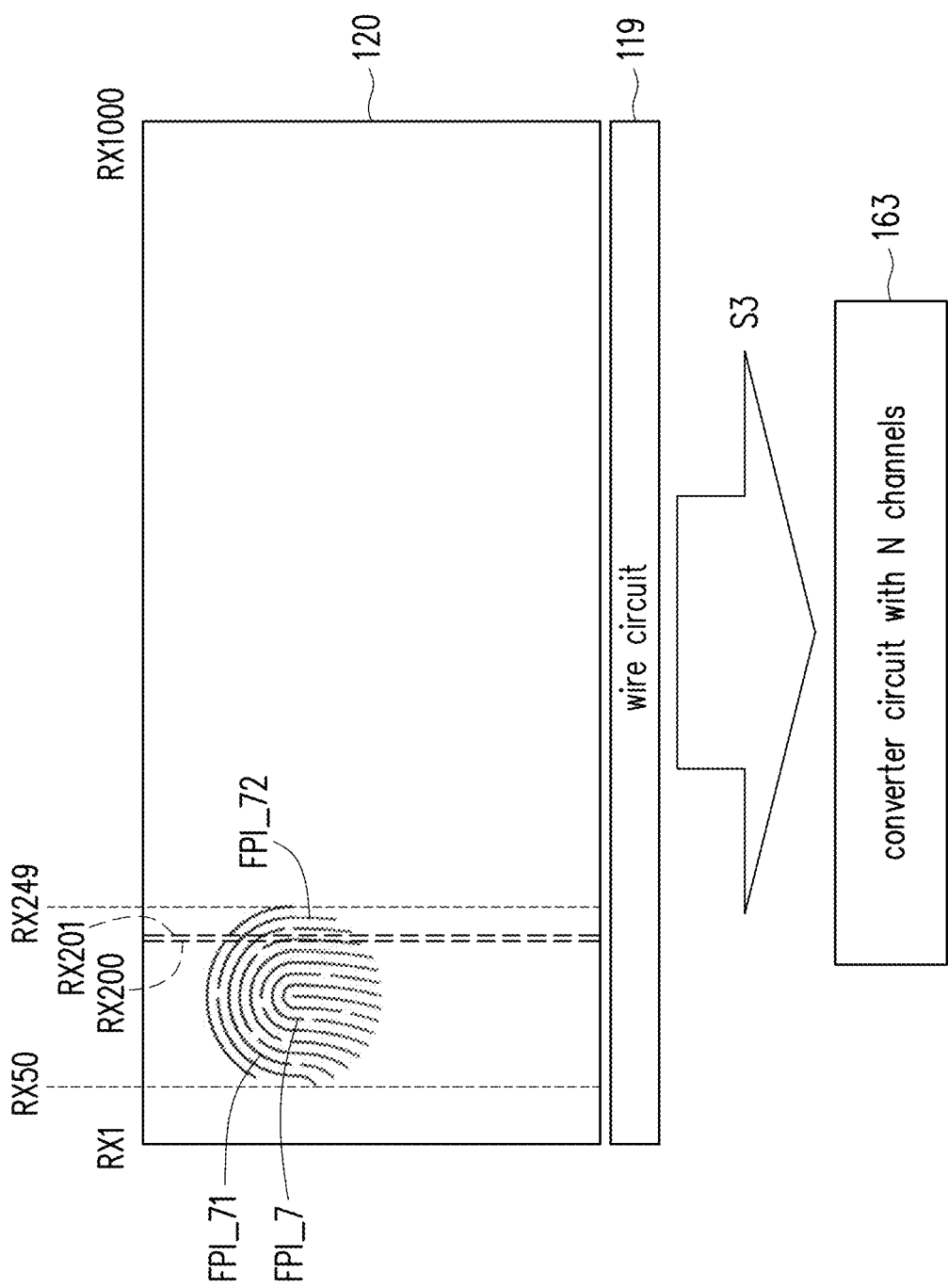
FIG. 11, FIG. 12 and FIG. 13 are schematic diagrams illustrating a remapping operation according to an embodiment of the invention.
Figures 12, 13:
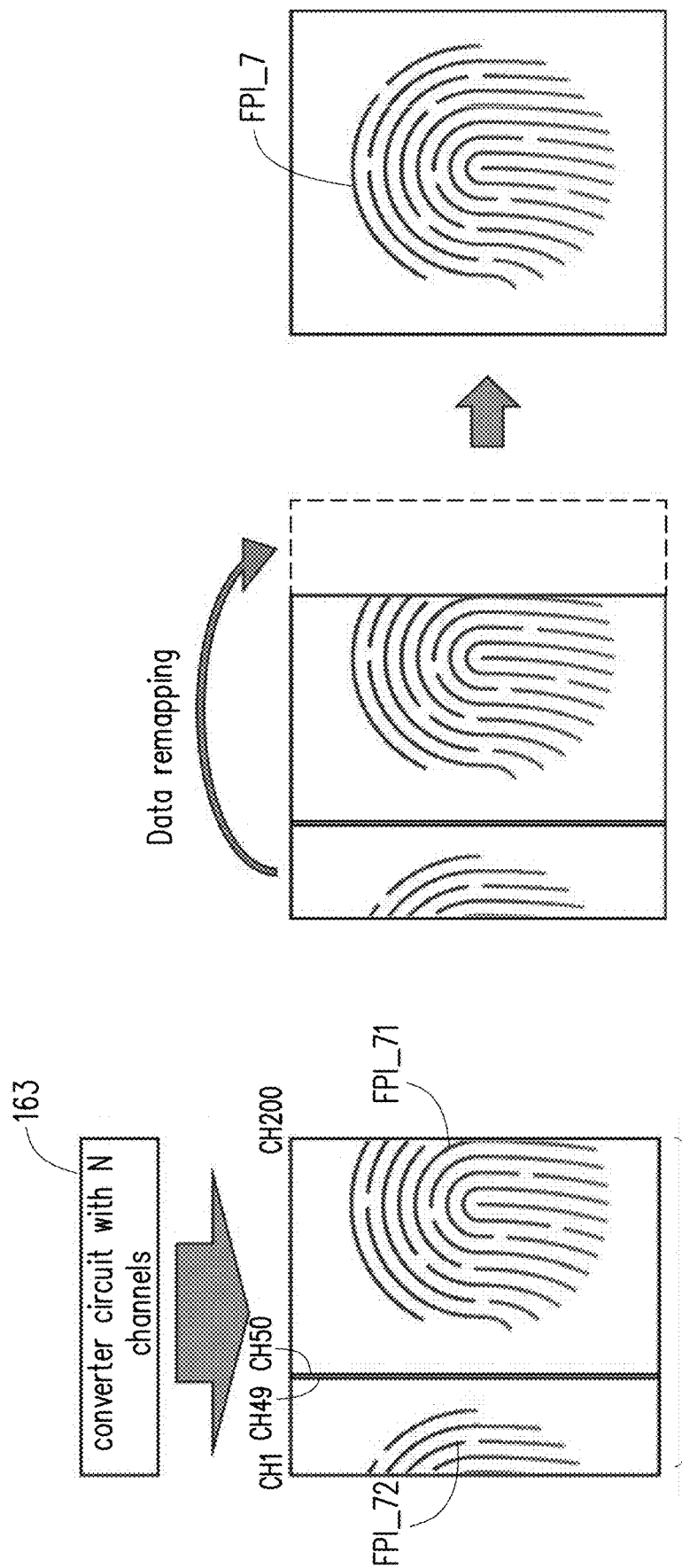

FIG. 11, FIG. 12 and FIG. 13 are schematic diagrams illustrating a remapping operation according to an embodiment of the invention. Referring to FIG. 11 to FIG. 13, the fingerprint sensing circuit 116 generates the fingerprint image FPI_7 according to the fingerprint sensing signal S3 by a remapping operation. The converter circuit 163 may be designed to have 200 fingerprint sensing channels, and the number of the fingerprint sensing lines is 1000. The number of the fingerprint sensing lines and the number of the fingerprint sensing channels are disclosed for example, and the invention is not limited thereto.

In the present embodiment, the digital circuit 161 selects the fingerprint sensing lines RX50 to RX249 for fingerprint sensing, and the fingerprint sensing lines RX50 and RX249 are selected to be boundaries of the fingerprint sensing zone. Fingerprint sensing zones of the display panel 120 are not determined for each of the fingerprint sensing lines RX1 to RX1000 in advance. The fingerprint sensing signal S3 carried on the fingerprint sensing lines RX50 to RX249 are read out by the converter circuit 163 at a time. The converter circuit 163 receives the fingerprint sensing signal S3 from the fingerprint sensing lines RX50 to RX249 in a single-turn receiving manner. That is to say, the converter circuit 163 receives the fingerprint sensing signal S3 from all of the selected fingerprint sensing lines RX50 to RX249 at once during the same fingerprint sensing phase. After signal conversion operation, the converter circuit 163 transmits the fingerprint sensing signal S3 as depicted in FIG. 12 from the fingerprint sensing channels CH1 to CH200 to the digital circuit 161.

In the present embodiment, the first part FPI_71 of the fingerprint image FPI_7 is sensed via the fingerprint sensors connected to the fingerprint sensing lines RX50 to RX200 and transmitted to the fingerprint sensing channels CH50 to CH200. The second part FPI_2 of the fingerprint image FPI_7 is sensed via the fingerprint sensors connected to the fingerprint sensing lines RX201 to RX249 and transmitted to the fingerprint sensing channels CH1 to CH49. The fingerprint sensing circuit 116 generates the fingerprint image FPI_7 according to the fingerprint sensing signal S3 by the remapping operation as depicted in FIG. 13. The second part FPI_72 is moved from the left side of the first part FPI_71 to the right side, such that the remapped fingerprint image FPI_7 is generated.

Figure 15:
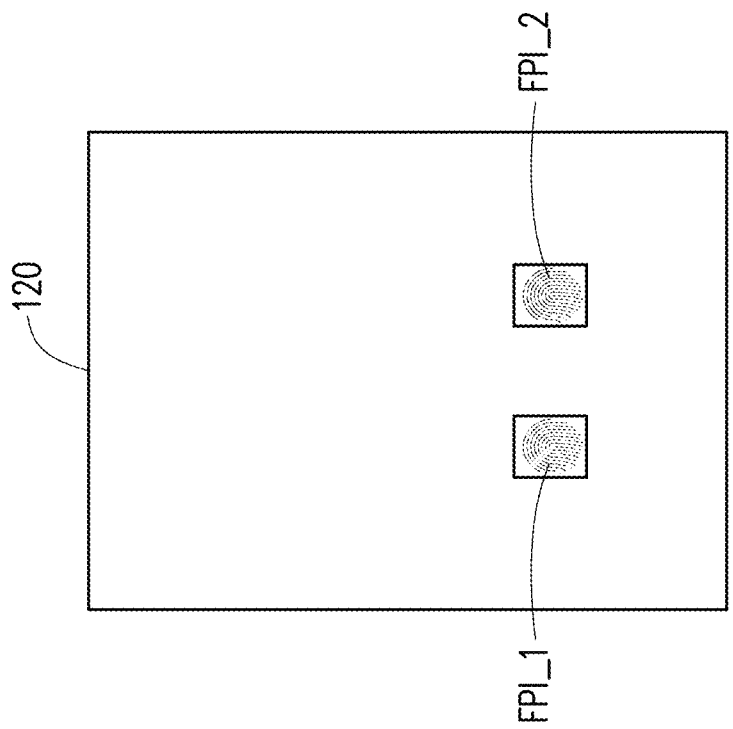
FIG. 14 and FIG. 15 are schematic diagrams illustrating display panels operating for sensing multiple fingerprint images according to different embodiments of the invention.
Figure 14:
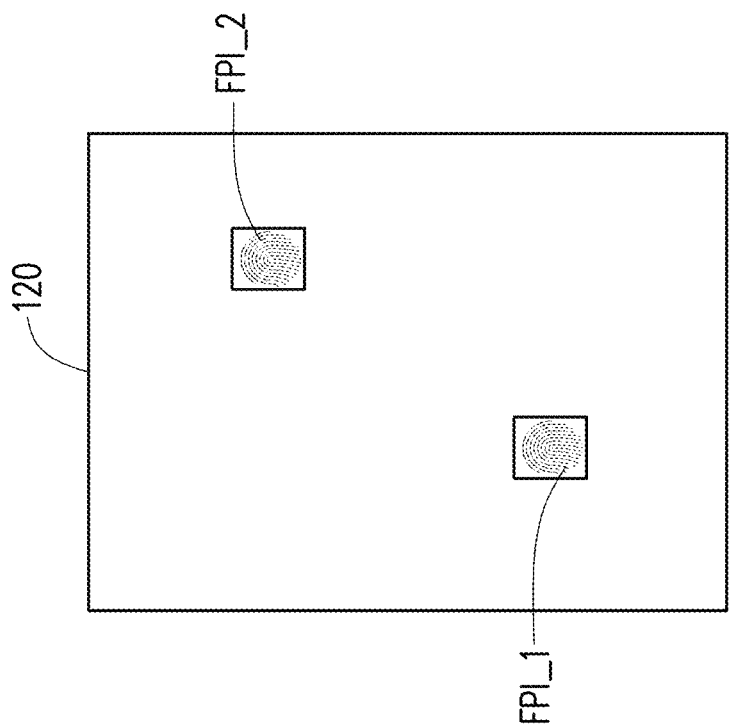

FIG. 14 and FIG. 15 are schematic diagrams illustrating display panels operating for sensing multiple fingerprint images according to different embodiments of the invention. Referring to FIG. 14 and FIG. 15, the electronic circuit 110 may drive and control the display panel 120 to sense multiple fingerprint images FPI_1 and FPI_2 on the display panel 120 at the same time. The fingerprint images FPI_1 and FPI_2 may be located in different rows as shown in FIG. 14, and the fingerprint images FPI_1 and FPI_2 may be located in the same rows as shown in FIG. 15.

In FIG. 14, the touch controller 141 informs the fingerprint sensing circuit 116 to sense the fingerprint images FPI_1 and FPI_2 via different parts of the fingerprint scan lines GSL. The fingerprint sensing circuit 116 receives the fingerprint sensing signal from all of the selected fingerprint sensing lines corresponding to the fingerprint images FPI_1 and FPI_2 at once during the same fingerprint sensing phase.

In FIG. 15, the touch controller 141 informs the fingerprint sensing circuit 116 to sense the fingerprint images FPI_1 and FPI_2 via the same part of the fingerprint scan lines GSL. The fingerprint sensing circuit 116 receives the fingerprint sensing signal from all of the selected fingerprint sensing lines corresponding to the fingerprint images FPI_1 and FPI_2 at once during the same fingerprint sensing phase.

Figure 16:
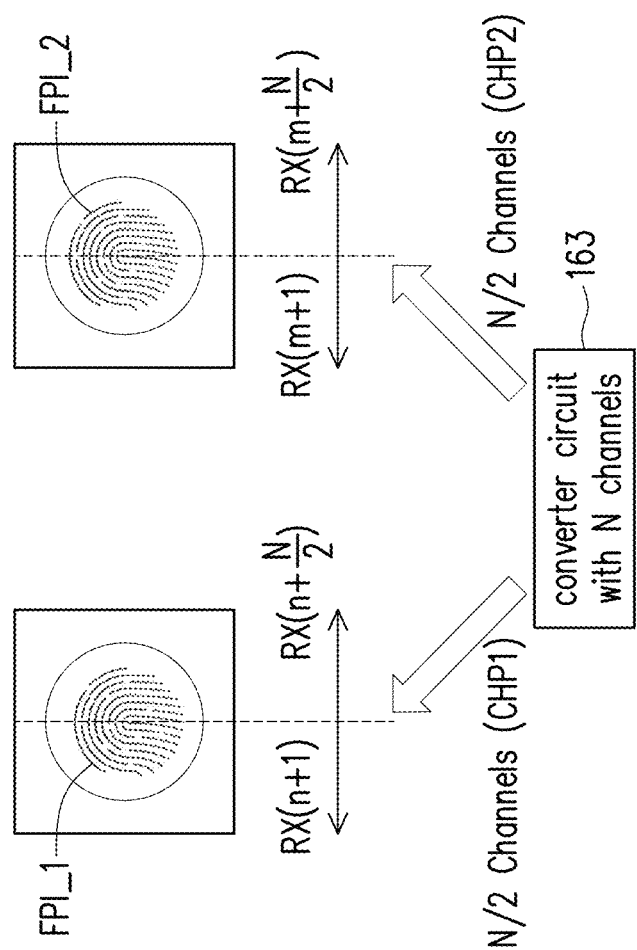
FIG. 16 is a schematic diagram illustrating converter circuit of the fingerprint sensing circuit configured to sense multiple fingerprint images according to an embodiment of the invention.

FIG. 16 is a schematic diagram illustrating converter circuit of the fingerprint sensing circuit configured to sense multiple fingerprint images according to an embodiment of the invention. For sensing multiple fingerprint images FPI_1 and FPI_2, the converter circuit 163 may be designed to have N fingerprint sensing channels to receive and process the corresponding fingerprint sensing signal.

In FIG. 16, the N fingerprint sensing channels are grouped into two parts CHP1 and CHP2. Each part includes part of the fingerprint sensing channels to receive and process the corresponding fingerprint sensing signal. For example, if N is an even number, the fingerprint sensing circuit 116 may select the fingerprint sensing lines RX(n+1) to RX(n+N/2) to sense the fingerprint image FPI_1, and the fingerprint sensing lines RX(n+1) and RX(n+N/2) are selected to be boundaries of the fingerprint sensing zone. The fingerprint sensing signal corresponding to the fingerprint image FPI_1 is transmitted to the first part CHP1 with N/2 fingerprint sensing channels. On the other hand, the fingerprint sensing circuit 116 selects the fingerprint sensing lines RX(m+1) to RX(m+N/2) to sense the fingerprint image FPI_2, and the fingerprint sensing lines RX(m+1) and RX(m+N/2) are selected to be boundaries of the fingerprint sensing zone. The fingerprint sensing signal corresponding to the fingerprint image FPI_2 is transmitted to the second part CHP2 with N/2 fingerprint sensing channels. The fingerprint sensing signals carried on the selected part of fingerprint sensing lines RX(n+1) to RX(n+N/2) and RX(m+1) to RX(m+N/2) may be read out by the converter circuit 163 at a time. In an embodiment, the numbers of the fingerprint sensing channels of the two parts CHP1 and CHP2 are not necessary to be equal. Also, the total number of the fingerprint sensing channels of CHP1 and CHP2 can be smaller than or equal to N.

Figure 17:
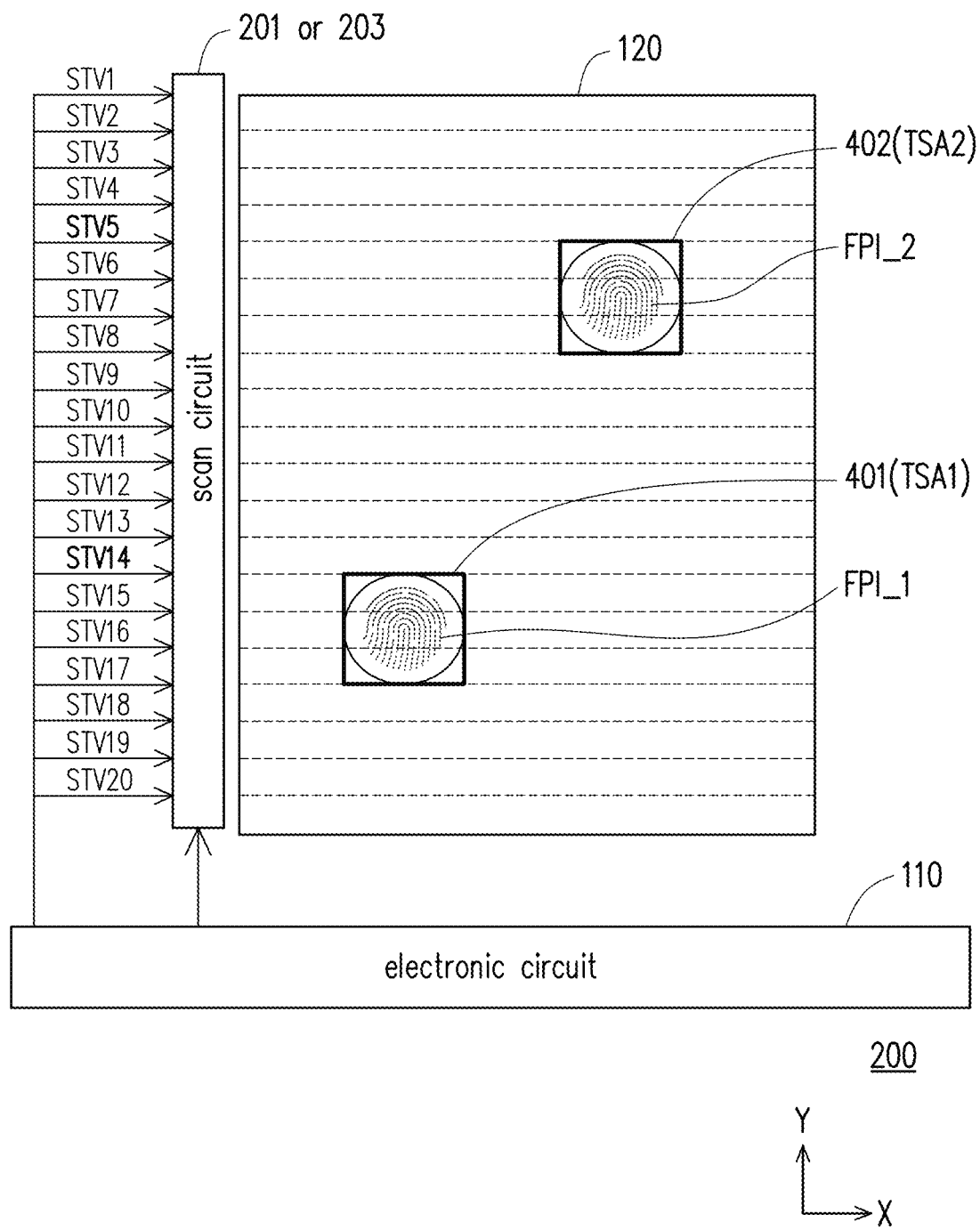
FIG. 17 is a schematic diagram illustrating control of the scan circuit configured to sense multiple fingerprint images according to an embodiment of the invention.

FIG. 17 is a schematic diagram illustrating control of the scan circuit configured to sense multiple fingerprint images according to an embodiment of the invention. Referring to FIG. 17, the electronic circuit 110 controls the display panel 120 to sense multiple fingerprint images FPI_1 and FPI 2. The electronic circuit 110 determines the coordinates of the touch areas TSA1 and TSA2 corresponding to the fingerprint images FPI_1 and FPI_2. The fingerprint sensing zones 401 and 402 are respectively defined by the touch areas TSA1 and TSA2. If the multiple fingerprint images FPI_1 and FPI_2 are not overlapped in the X direction, the electronic circuit 110 can control the scan circuits 201 and/or 203 to scan the fingerprint sensing zones 401 and 402 during the same fingerprint sensing phase in the Y direction. The fingerprint sensing zones 401 and 402 may be simultaneously scanned to reduce sensing time.

In summary, in the embodiments of the invention, fingerprint sensing zones of the display panel are not determined for each of the fingerprint sensing lines in advance, and the touch area defines the fingerprint sensing zone for covering a fingerprint image. A part of the fingerprint sensing lines and a part of the fingerprint scan lines are selected for fingerprint sensing operation according to the touch area. A part of switches corresponding to the part of fingerprint sensing lines is turned on to couple the part of fingerprint sensing lines to the fingerprint sensing channels. A part of the fingerprint sensing lines collocated with the touch area on the display panel is selected among a plurality of the fingerprint sensing lines arranged all over the display panel. The selected fingerprint sensing lines may flexibly form a single fingerprint sensing zone having a range determined by the touch area, and fingerprint sensing signals carried on the selected fingerprint sensing lines may be read out at a time, such that only a single-turn receiving of fingerprint sensing signals in fingerprint sensing channels is required for sensing one horizontal line of the fingerprint image. The time for fingerprint sensing is reduced. Therefore, the process for fingerprint sensing and identification is more efficient, and users have good user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic circuit, adapted to drive a panel comprising touch sensors and fingerprint sensors, the electronic circuit comprising:
a first circuit, configured to receive touch sensing signals from the touch sensors;
a second circuit, configured to receive fingerprint sensing signals corresponding to at least one fingerprint image from the fingerprint sensors via fingerprint sensing lines;
a control circuit, configured to determine a touch area according to the touch sensing signals and select a part of the fingerprint sensing lines to form a fingerprint sensing zone for a fingerprint sensing operation according to the determined touch area, wherein each of the fingerprint sensing lines is selectable to be a boundary of the fingerprint sensing zone; and
a switch circuit, coupled to the fingerprint sensing lines and configured to receive the fingerprint sensing signals from the fingerprint sensing lines,
wherein the control circuit controls the switch circuit to select the part of the fingerprint sensing lines for the fingerprint sensing operation,
wherein the second circuit comprises a plurality of fingerprint sensing channels coupled to the switch circuit, and the fingerprint sensing channels receive the fingerprint sensing signals from the part of the fingerprint sensing lines,
wherein a number of the fingerprint sensing lines is larger than a number of the fingerprint sensing channels.

2. The electronic circuit of claim 1, wherein the switch circuit comprises a plurality of switches, the control circuit controls the switch circuit to turn on a part of the plurality of switches corresponding to the part of the fingerprint sensing lines to establish coupling between the part of the fingerprint sensing lines and the fingerprint sensing channels for the fingerprint sensing operation.

3. The electronic circuit of claim 2, wherein the control circuit controls the switch circuit to turn off the rest of the plurality of switches corresponding to the rest of the fingerprint sensing lines that is not selected.

4. The electronic circuit of claim 1, wherein the electronic circuit is implemented in a single semiconductor chip.

5. The electronic circuit of claim 1, wherein the electronic circuit is implemented in at least two semiconductor chips, wherein a first semiconductor chip comprises the first circuit and a second semiconductor chip comprises the second circuit.

6. The electronic circuit of claim 5, wherein the first semiconductor chip further comprises at least a part of the control circuit and the second semiconductor chip further comprises the switch circuit.

7. The electronic circuit of claim 1, wherein the determined touch area comprises a center line, and a middle fingerprint sensing line of the part of the fingerprint sensing lines is located on or near to the center line of the determined touch area.

8. The electronic circuit of claim 1, wherein the fingerprint sensing signals carried on the part of the fingerprint sensing lines are read out by the second circuit at a time.

9. The electronic circuit of claim 1,
wherein the control circuit controls the second circuit to sense a plurality of fingerprint images, and the fingerprint sensing channels are grouped into a plurality of parts, and each of the parts receives the fingerprint sensing signals of the corresponding fingerprint image.

10. The electronic circuit of claim 1, wherein the fingerprint sensors are controlled by fingerprint scan lines, and the control circuit is further configured to select a part of the fingerprint scan lines for the fingerprint sensing operation according to the determined touch area.

11. The electronic circuit of claim 10, wherein the control circuit controls the second circuit to sense a plurality of fingerprint images via the same part of the fingerprint scan lines.

12. The electronic circuit of claim 10, wherein the control circuit controls the second circuit to sense a plurality of fingerprint images via different parts of the fingerprint scan lines.

13. The electronic circuit of claim 1, wherein the second circuit generates the fingerprint mage according to the fingerprint sensing signals by a remapping operation.

14. The electronic circuit of claim 1, wherein the fingerprint sensors comprise a plurality of optical fingerprint sensors distributed in the panel.

15. The electronic circuit of claim 1, wherein the fingerprint sensing zone covers at least a portion of the at least one fingerprint image comprising sufficient fingerprint features for fingerprint identification.

16. The electronic circuit of claim , wherein the fingerprint sensing zone covers a full range of the at least one fingerprint image.

17. An electronic device, comprising:
a panel comprising touch sensors and fingerprint sensors; and
an electronic circuit, configurable to be coupled to the panel and adapted to receive touch sensing signals from the touch sensors and receive fingerprint sensing signals corresponding to at least one fingerprint image from the fingerprint sensors via fingerprint sensing lines of the panel,
wherein the electronic circuit comprises a control circuit, and the control circuit is configured to determine a touch area according to the touch sensing signals and select a part of the fingerprint sensing lines to form a fingerprint sensing zone for a fingerprint sensing operation according to the determined touch area, wherein each of the fingerprint sensing lines is selectable to be a boundary of the fingerprint sensing zone,
wherein the electronic circuit further comprises:
a first circuit, configured to receive the touch sensing signals from the touch sensors;
a second circuit, configured to receive the fingerprint sensing signals from the fingerprint sensors via the fingerprint sensing lines; and
a switch circuit, coupled to the fingerprint sensing lines and configured to receive the fingerprint sensing signals from the fingerprint sensing lines,
wherein the control circuit controls the switch circuit to select the part of the fingerprint sensing lines for the fingerprint sensing operation,
wherein the second circuit comprises a plurality of fingerprint sensing channels coupled to the switch circuit, and the fingerprint sensing channels receive the fingerprint sensing signals from the part of the fingerprint sensing lines,
wherein a number of the fingerprint sensing lines is larger than a number of the fingerprint sensing channels.

18. The electronic device of claim 17, wherein the switch circuit comprises a plurality of switches, the control circuit controls the switch circuit to turn on a part of the plurality of switches corresponding to the part of the fingerprint sensing lines to establish coupling between the part of the fingerprint sensing lines and the fingerprint sensing channels for the fingerprint sensing operation.

19. The electronic device of claim 18, wherein the control circuit controls the switch circuit to turn off the rest of the plurality of switches corresponding to the rest of the fingerprint sensing lines that is not selected.

20. The electronic device of claim 17, wherein the electronic circuit is implemented in a single semiconductor chip.

21. The electronic device of claim 17, wherein the electronic circuit is implemented in at least two semiconductor chips, wherein a first semiconductor chip comprises the first circuit and a second semiconductor chip comprises the second circuit.

22. The electronic device of claim 21, wherein the first semiconductor chip further comprises at least a part of the control circuit and the second semiconductor chip further comprises the switch circuit.

23. The electronic device of claim 17, wherein the determined touch area comprises a center line, and a middle fingerprint sensing line of the part of the fingerprint sensing lines is located on or near to the center line of the determined touch area.

24. The electronic device of claim 17, wherein the fingerprint sensing signals carried on the part of the fingerprint sensing lines are read out by the second circuit at a time.

25. The electronic device of claim 17, wherein the control circuit controls the second circuit to sense a plurality of fingerprint images, and the fingerprint sensing channels are grouped into a plurality of parts, and each of the parts receives the fingerprint sensing signals of the corresponding fingerprint image.

26. The electronic device of claim 17, wherein the panel comprises:
a scan circuit, configured to control the fingerprint sensors by fingerprint scan lines, and the control circuit is further configured to select a part of the fingerprint scan lines for the fingerprint sensing operation according to the determined touch area.

27. The electronic device of claim 26, wherein the control circuit controls the second circuit to sense a plurality of fingerprint images via the same part of the fingerprint scan lines.

28. The electronic device of claim 26, wherein the control circuit controls the second circuit to sense a plurality of fingerprint images via different parts of the fingerprint scan lines.

29. The electronic device of claim 17, wherein the second circuit generates the fingerprint image according to the fingerprint sensing signals by a remapping operation.

30. The electronic device of claim 17, wherein the fingerprint sensors comprise a plurality of optical fingerprint sensors distributed in the panel.

31. The electronic device of claim 17, wherein the fingerprint sensing zone covers at least a portion of the at least one fingerprint image comprising sufficient fingerprint features for fingerprint identification.

32. The electronic device of claim 17, wherein the fingerprint sensing zone covers a full range of the at least one fingerprint image.

33. A method for sensing at least one fingerprint image, adapted to a panel comprising touch sensors and fingerprint sensors, wherein the fingerprint sensors are coupled to fingerprint sensing lines, the method comprising:
 determining a touch area according to touch sensing signals from the touch sensors;
 selecting a part of the fingerprint sensing lines to form a fingerprint sensing zone for a fingerprint sensing operation according to the determined touch area, wherein each of the fingerprint sensing lines is selectable to be a boundary of the fingerprint sensing zone;
 controlling a switch circuit to select the part of the fingerprint sensing lines for the fingerprint sensing operation; and
 receiving fingerprint sensing signals via the part of the fingerprint sensing lines through a plurality of fingerprint sensing channels coupled to the switch circuit,
 wherein a number of the fingerprint sensing lines is larger than a number of the fingerprint sensing channels.

34. The method of claim 33, wherein the switch circuit comprises a plurality of switches, and the step of controlling the switch circuit to select the part of the fingerprint sensing lines for the fingerprint sensing operation comprises:
 controlling the switch circuit to turn on a part of the plurality of switches corresponding to the part of the fingerprint sensing lines; and
 controlling the switch circuit to turn off the rest of the plurality of switches corresponding to the rest of the fingerprint sensing lines that is not selected.

35. The method of claim 33, wherein the fingerprint sensors are further coupled to fingerprint scan lines, the method further comprising:
 selecting a part of the fingerprint scan lines for the fingerprint sensing operation according to the determined touch area.

36. The method of claim 33, further comprising:
 generating the fingerprint image according to the fingerprint sensing signals by a remapping operation.

37. An electronic circuit, comprising:
 a touch control circuit, configured to receive touch sensing signals from a panel and determine a touch area according to the touch sensing signals;
 a fingerprint sensing circuit, configured to receive fingerprint sensing signals corresponding to at least one fingerprint image from fingerprint sensors disposed in the panel via fingerprint sensing lines; and
 a switch circuit, coupled to the fingerprint sensing circuit and configured to be coupled to a part of the fingerprint sensing lines that is selected to form a fingerprint sensing zone for a fingerprint sensing operation according to the determined touch area, wherein each of the fingerprint sensing lines is selectable to be a boundary of the fingerprint sensing zone,
 wherein the fingerprint sensing circuit comprises a plurality of fingerprint sensing channels coupled to the switch circuit, and the fin ernrint sensing channels receive the fingerprint sensing signals from the part of the fingerprint sensing lines,
 wherein a number of the fingerprint sensing lines is larger than a number of the fingerprint sensing channels.

38. The electronic circuit of claim 37, wherein the touch control circuit controls the switch circuit to select the part of the fingerprint sensing lines to form the fingerprint sensing zone for the fingerprint sensing operation according to the determined touch area.

39. The electronic circuit of claim 37, wherein the switch circuit comprises a plurality of switches, the touch control circuit controls the switch circuit to turn on a part of the plurality of switches corresponding to the part of the fingerprint sensing lines to establish coupling between the part of the fingerprint sensing lines and the fingerprint sensing channels for the fingerprint sensing operation.

40. The electronic circuit of claim 39, wherein the touch control circuit controls the switch circuit to turn off the rest of the plurality of switches corresponding to the rest of the fingerprint sensing lines that is not selected.

41. The electronic circuit of claim 37, wherein the electronic circuit is implemented in a single semiconductor chip.

42. The electronic circuit of claim 37, wherein the electronic circuit is implemented in at least two semiconductor chips, wherein a first semiconductor chip comprises at least a part of the touch control circuit and a second semiconductor chip comprises the fingerprint sensing circuit.

43. The electronic circuit of claim 42, wherein the second semiconductor chip further comprises the switch circuit.

44. The electronic circuit of claim 37, wherein the determined touch area comprises a center line, and a middle fingerprint sensing line of the part of the fingerprint sensing lines is located on or near to the center line of the determined touch area.

45. The electronic circuit of claim 37, wherein the fingerprint sensing signals carried on the part of the fingerprint sensing lines are read out by the fingerprint sensing circuit at a time.

46. The electronic circuit of claim 37,
 wherein the touch control circuit controls the fingerprint sensing circuit to sense a plurality of fingerprint images, and the fingerprint sensing channels are grouped into a plurality of parts, and each of the parts receives the fingerprint sensing signals of the corresponding fingerprint image.

47. The electronic circuit of claim 37, wherein the fingerprint sensors are controlled by fingerprint scan lines, and the touch control circuit is further configured to select a part of the fingerprint scan lines for the fingerprint sensing operation according to the determined touch area.

48. The electronic circuit of claim 47, wherein the touch control circuit controls the fingerprint sensing circuit to sense a plurality of fingerprint images via the same part of the fingerprint scan lines.

49. The electronic circuit of claim 47, wherein the touch control circuit controls the fingerprint sensing circuit to sense a plurality of fingerprint images via different parts of the fingerprint scan lines.

50. The electronic circuit of claim 37, wherein the fingerprint sensing circuit generates the fingerprint image according to the fingerprint sensing signals by a remapping operation.

51. The electronic circuit of claim 37, wherein the fingerprint sensors comprise a plurality of optical fingerprint sensors distributed in the panel.

52. The electronic circuit of claim 37, wherein the fingerprint sensing zone covers at least a portion of the at least one fingerprint image comprising sufficient fingerprint features for fingerprint identification.

53. The electronic circuit of claim 37, wherein the fingerprint sensing zone covers a full range of the at least one fingerprint image.

* * * * *